(12) United States Patent
Liu et al.

(10) Patent No.: US 11,294,962 B2
(45) Date of Patent: Apr. 5, 2022

(54) METHOD FOR PROCESSING RANDOM INTERACTION DATA, NETWORK SERVER AND INTELLIGENT DIALOG SYSTEM

(71) Applicant: TENCENT TECHNOLOGY (SHENZHEN) COMPANY LIMITED, Shenzhen (CN)

(72) Inventors: Qiuge Liu, Shenzhen (CN); Yanxiong Lu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 319 days.

(21) Appl. No.: 16/201,415

(22) Filed: Nov. 27, 2018

(65) Prior Publication Data

US 2019/0147001 A1    May 16, 2019

Related U.S. Application Data

(63) Continuation of application No. PCT/CN2017/092485, filed on Jul. 11, 2017.

(30) Foreign Application Priority Data

Jul. 14, 2016    (CN) .......................... 201610554620.9
Jul. 14, 2016    (CN) .......................... 201610556147.8

(51) Int. Cl.
*G10L 15/22*    (2006.01)
*G10L 15/30*    (2013.01)
(Continued)

(52) U.S. Cl.
CPC ........ *G06F 16/90332* (2019.01); *G10L 15/22* (2013.01); *G10L 15/30* (2013.01); *H04L 51/02* (2013.01); *G10L 2015/225* (2013.01)

(58) Field of Classification Search
CPC .......... G06F 40/35; G06F 40/56; G06F 40/20; G06F 16/3329
(Continued)

(56) References Cited

U.S. PATENT DOCUMENTS 7,603,413 B1 * 10/2009 Herold ................... G06Q 10/10
                                                           709/204
9,292,667 B1 * 3/2016 Cabanero ............ G06F 16/9537
(Continued)

FOREIGN PATENT DOCUMENTS

CN          1735027 A       2/2006
CN        101076061 A      11/2007
(Continued)

OTHER PUBLICATIONS

The State Intellectual Property Office of the People's Republic of China (SIPO) Office Action 1 for 201610554620.9 dated Dec. 9, 30, 2019 10 Pages (including translation).
(Continued)

*Primary Examiner* — Richemond Dorvil
*Assistant Examiner* — Rodrigo A Chavez
(74) *Attorney, Agent, or Firm* — Anova Law Group, PLLC

(57) ABSTRACT

A method is provided for processing random interaction data. The method includes receiving random interaction data sent by a first terminal, and adding the random interaction data to a resource pool. The random interaction data carries user attribute information and inputted conversation information of a user of the first terminal. The method also includes, when no reply message for the random interaction data is received from one or more second terminals, activating a second interface and sending the random interaction data to an intelligent dialog system via the second interface, where the intelligent dialog system is configured to auto-
(Continued)

matically generate reply information according to at least the inputted conversation information and the user attribute information. The method also includes receiving the reply information returned by the intelligent dialog system; and sending the reply information to the first terminal.

15 Claims, 16 Drawing Sheets

(51) Int. Cl.
*G06F 16/9032* (2019.01)
*H04L 51/02* (2022.01)

(58) Field of Classification Search
USPC .............................................................. 704/9
See application file for complete search history.

(56) References Cited

U.S. PATENT DOCUMENTS

| | | | |
|---|---|---|---|
| 2002/0055973 | A1 | 5/2002 | Low et al. |
| 2009/0157223 | A1 | 6/2009 | Park et al. |
| 2009/0228264 | A1* | 9/2009 | Williams ............ G06F 16/3344 704/9 |
| 2011/0288897 | A1* | 11/2011 | Erhart ..................... G06Q 10/06 705/7.13 |
| 2012/0041903 | A1 | 2/2012 | Beilby et al. |
| 2012/0059896 | A1 | 3/2012 | Li |
| 2013/0282594 | A1* | 10/2013 | Gaedcke ............ G06Q 30/0241 705/304 |
| 2014/0122083 | A1 | 5/2014 | Xiaojiang |
| 2014/0297764 | A1* | 10/2014 | Skiba .................. G10L 15/1822 709/206 |
| 2016/0043827 | A1* | 2/2016 | Filson .................... H04K 3/226 370/252 |
| 2016/0092567 | A1 | 3/2016 | Li et al. |
| 2016/0112364 | A1* | 4/2016 | Gelyana .................. H04L 51/10 709/206 |

FOREIGN PATENT DOCUMENTS

| | | |
|---|---|---|
| CN | 101471892 A | 7/2009 |
| CN | 101588323 A | 11/2009 |
| CN | 102487363 A | 6/2012 |
| CN | 103150595 A | 6/2013 |
| CN | 103390047 A | 11/2013 |
| CN | 105068661 A | 11/2015 |
| CN | 105512228 A | 4/2016 |

OTHER PUBLICATIONS

The State Intellectual Property Office of the People's Republic of China (SIPO) Office Action 1 for 201610556147.8 dated Jun. 8, 26, 2019 15 Pages (including translation).
The European Patent Office (Epo) The Extended European Search Report for 17826971.8 dated Apr. 8, 25, 2019 10 Pages.
The World Intellectual Property Organization (WIPO) International Search Report for PCT/CN2017/092485 dated Oct. 9, 2017 6 Pages (including translation).

* cited by examiner

METHOD FOR PROCESSING RANDOM INTERACTION DATA, NETWORK SERVER AND INTELLIGENT DIALOG SYSTEM

RELATED APPLICATIONS

This application a continuation application of PCT Patent Application No. PCT/CN2017/092485, filed on Jul. 11, 2017, which claims priority to Chinese Patent Application No. 201610554620.9, entitled "METHOD FOR PROCESSING RANDOM INTERACTION DATA, NETWORK SERVER, AND INTELLIGENT DIALOG" filed on Jul. 14, 2016, and Chinese Patent Application No. 201610556147.8, entitled "CHAT CORPUS COLLECTION METHOD AND APPARATUS" filed on Jul. 14, 2016, all of which are incorporated by reference in their entirety.

FIELD OF TECHNOLOGY

The present application relates to the field of electronic technologies and, in particular, to a method for processing random interaction data, a network server, and an intelligent dialog system.

BACKGROUND

With the development of science and technology, there are more and more ways for users to communicate with each other. Some applications (such as WeChat and QQ) provide the function of random interaction data. First, a user of a first terminal can write dialog content (voice, picture, text) in random interaction data. Then, the random interaction data is added to a resource pool, and a second terminal can obtain the random interaction data from the resource pool, open the random interaction data, and reply to the dialog content in the random interaction data. Finally, the second terminal sends a reply message to the first terminal so that a dialog relationship is established between the two terminals. In addition, with the rapid development of chat bots, chat bots can be used in various scenarios to implement conversation between the chat bots and users.

The disclosed methods and systems are directed to solve one or more problems set forth above and other problems.

SUMMARY

One aspect of the present disclosure includes a method for processing random interaction data. The method includes receiving random interaction data sent by a first terminal, and adding the random interaction data to a resource pool. The random interaction data carries user attribute information and inputted conversation information of a user of the first terminal. The method also includes, when no reply message for the random interaction data is received from one or more second terminals, activating a second interface and sending the random interaction data to an intelligent dialog system via the second interface, where the intelligent dialog system is configured to automatically generate reply information according to at least the inputted conversation information and the user attribute information. The method also includes receiving the reply information returned by the intelligent dialog system; and sending the reply information to the first terminal.

Another aspect of the present disclosure includes another method for processing random interaction data. The method includes receiving random interaction data sent by a network server. The random interaction data carries user attribute information and inputted conversation information of a user of the first terminal, and the random interaction data is sent by the first terminal to the network server and, when no reply message for the random interaction data is received from a second terminal, further sent by the network server. The method also includes automatically generating reply information according to content in the random interaction data; and sending the reply information to the network server, such that the network server forwards the reply information to the first terminal Another aspect of the present disclosure includes a chat corpus collection method. An intelligent dialog system obtains a user identifier corresponding to a target user, and conversation initiation content is dynamically generated according to user image information corresponding to the user identifier and target corpus information. The conversation initiation content is then pushed to a network server connected to the intelligent dialog system; and the intelligent dialog system uses the network server to perform, between the intelligent dialog system and the target user, a conversation related to the conversation initiation content, and saves reply information of the intelligent dialog system and the target user in the conversation to form a chat corpus.

Other aspects of the present disclosure can be understood by those skilled in the art in light of the description, the claims, and the drawings of the present disclosure.

BRIEF DESCRIPTION OF THE DRAWINGS

In order to explain the technical solutions of the embodiments of the present application more clearly, drawings used in the description of the embodiments may be briefly described below. Obviously, the drawings in the following description are some but not all embodiments of the present application. Those skilled in the art can also obtain other drawings based on these drawings without creative effort.

DETAILED DESCRIPTION

The following describes the technical solutions in the embodiments of the present disclosure with reference to the accompanying drawings. Apparently, the described embodiments are merely some but not all of the embodiments of the present disclosure. Other embodiments obtained by a person of ordinary skill in the art based on the embodiments of the present disclosure without creative efforts shall fall within the protection scope of the present disclosure.

The exemplary embodiments may be described in detail herein, examples of which are illustrated in the accompanying drawings. When the following description refers to the accompanying drawings, unless otherwise indicated, like numerals in different drawings may indicate the same or similar elements. The implementations described in the following exemplary embodiments do not represent all implementations consistent with the present disclosure. Instead, they are merely examples of devices and methods consistent with some aspects of the invention as detailed in the appended claims.

In the existing scenario of user interaction, after sending random interaction data, many users may not receive reply to dialog content in the random interaction data from other users. For example, in a drift bottle application, after a user throws a drift bottle using the drift bottle function, another user picks up the drift bottle in the drift bottle pool, and after reading it, directly throws the drift bottle back into the drift bottle pool without replying to it. As a result, the frequency at which a user communicates using random interaction data is reduced.

Embodiments of the present disclosure provide a method for processing random interaction data, a network server, and an intelligent dialog system. In the embodiments of the present disclosure, when random interaction data sent by a user is not responded by another terminal, an intelligent dialog system can reply to the random interaction data, thereby increasing the reply rate of the random interaction data and increasing the frequency of dialog using the random interaction data.

Figure 1:
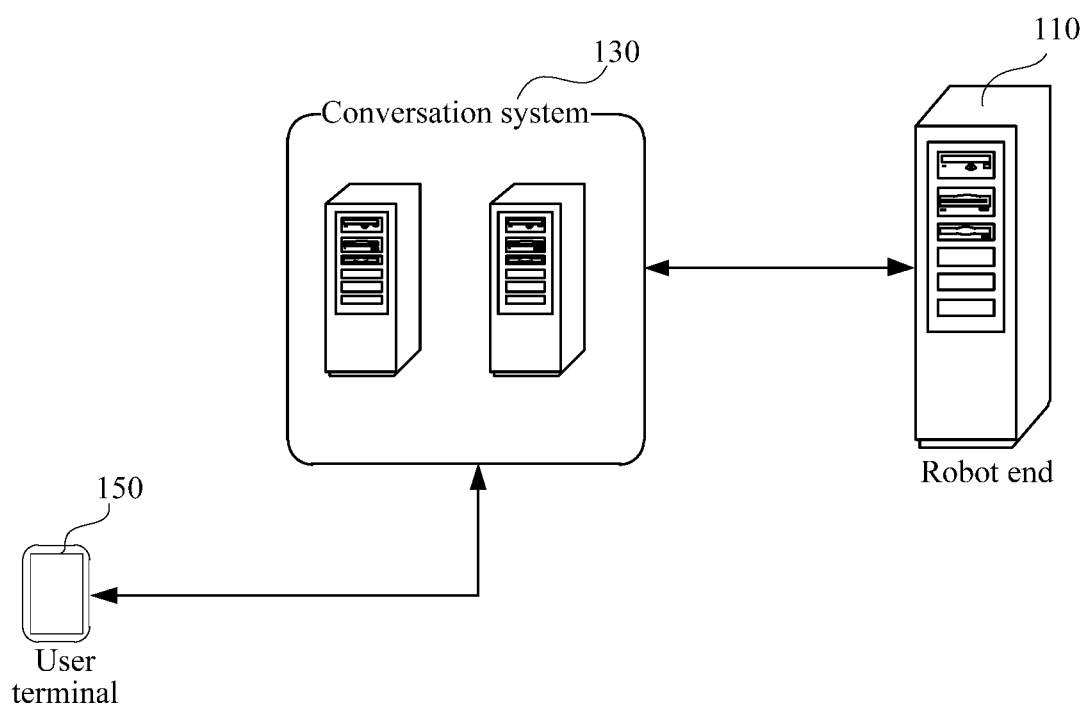
FIG. 1 is a schematic diagram of an implementation environment according to an embodiment of the present disclosure.

FIG. 1 is a schematic diagram of an implementation environment according to an embodiment of the present disclosure. The implementation environment includes an intelligent service system 110, a conversation system 130, and a user terminal 150.

The intelligent service system 110 and the user terminal 150 are connected to the conversation system 130 to implement conversation between the intelligent service system 110 and the user terminal 150. There may be more than one user terminal 150, and conversations may also be conducted among the user terminals 150.

Figure 2:
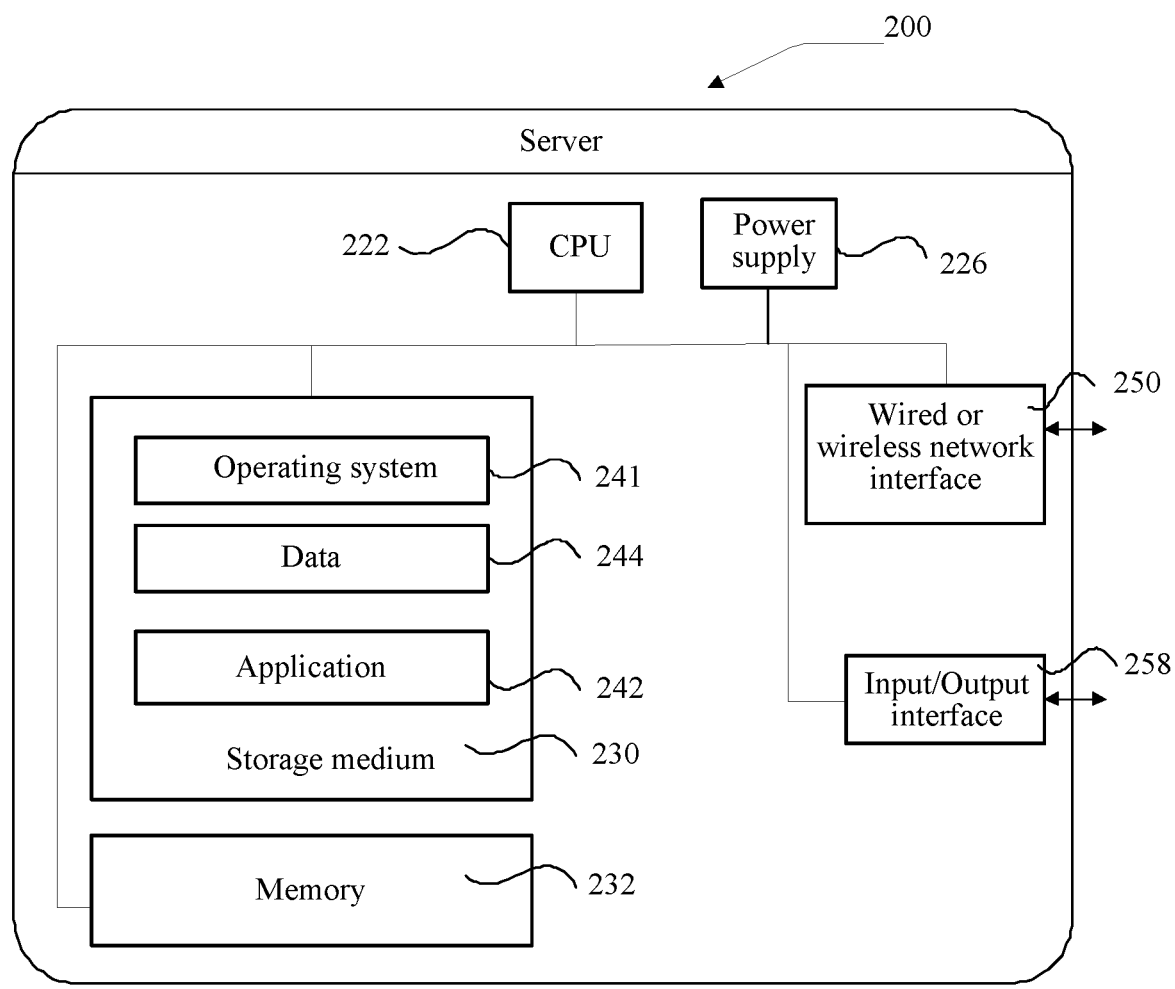
FIG. 2 is a block diagram of an apparatus according to an embodiment of the present disclosure.

FIG. 2 is a block diagram of an apparatus 200 according to an embodiment of the present disclosure. For example, the apparatus 200 may be the intelligent service system and the conversation system in the implementation environment shown in FIG. 1. The intelligent service system may be, for example, a server running robot software. The conversation system is a server or a server cluster configured to implement a conversation function.

Referring to FIG. 2, the apparatus 200 may differ greatly due to differences in configuration or performance. The apparatus 200 may include one or more central processing units (CPUs) 222 (for example, one or more processors), a memory 232, and one or more storage media 230 (for example, one or more mass storage devices) storing an application 242 or data 244. The memory 232 and the storage medium 230 may be transient storage or permanent storage. The program stored on the storage medium 230 may include one or more modules (not shown), and each module may include a series of instruction operations in the server. Still further, the central processing unit 222 may be configured to communicate with the storage medium 230, so that the server 200 performs a series of instruction operations in the storage medium 230. The server 200 may also include one or more power supplies 226, one or more wired or wireless network interfaces 250, one or more input/output interfaces 258, and/or one or more operating systems 241, for example, Windows Server™, Mac OS X™, Unix™, Linux™, FreeBSD™, and the like. The steps performed by the server described in the embodiments shown in FIG. 8, FIG. 9, FIG. 10, FIG. 12, FIG. 13, FIG. 14, FIG. 15, FIG. 19 and FIG. 20 described below may be based on the server architecture shown in FIG. 2.

All or part of the steps of the embodiments in the above drawings may be completed by hardware, and may also be completed by a program that instructs relevant hardware. The program may be stored in a computer-readable storage medium. The above-mentioned storage medium may be a read-only memory, a magnetic disk, or an optical disc.

Figure 3:
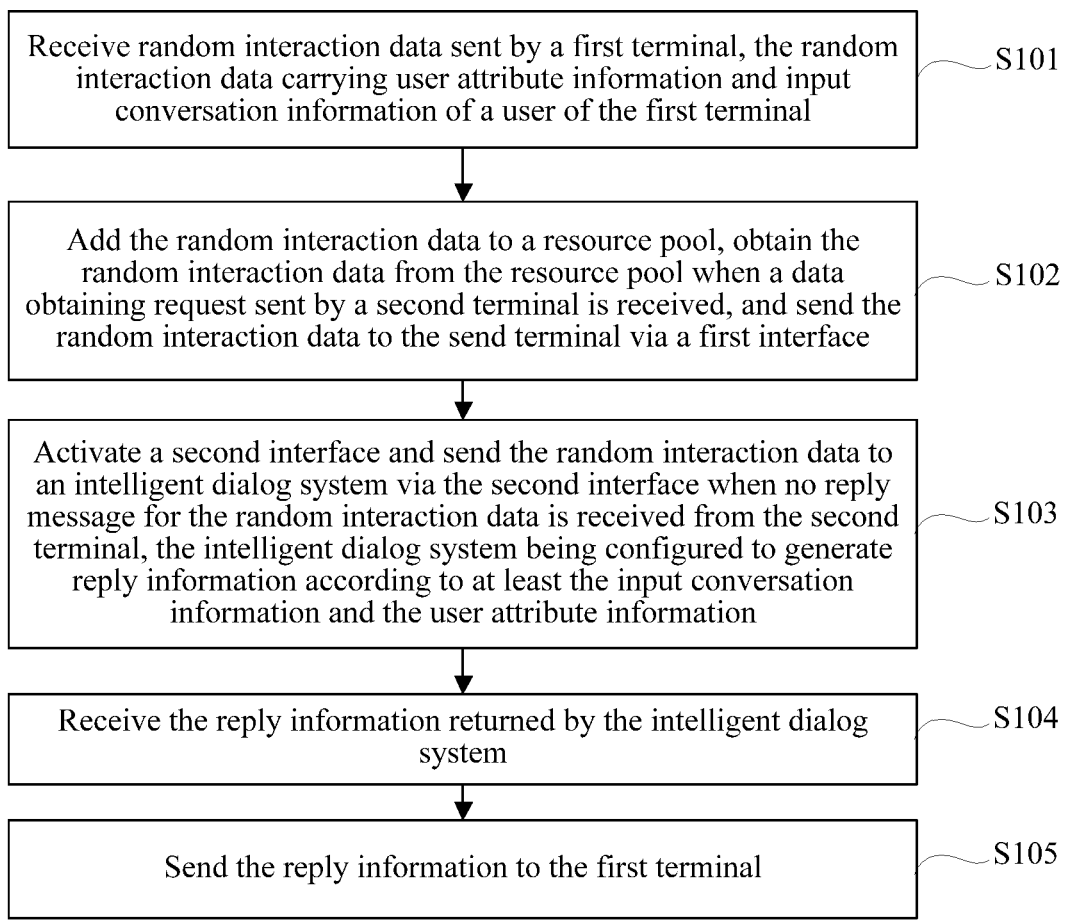
FIG. 3 is a flowchart of a method for processing random interaction data according to an embodiment of the present disclosure.

FIG. 3 is a flowchart of a method for processing random interaction data according to an embodiment of the present disclosure. As shown in FIG. 3, this embodiment of the present disclosure is executed by a network server (also referred to as a server or a conversation system), which, for example, can be applied in a drift bottle application environment. The method includes the followings.

S101: Receiving random interaction data sent by a first terminal, the random interaction data carrying user attribute information and inputted conversation information of a user of the first terminal.

For example, the first terminal is one of the user terminals 150 in FIG. 1. The user of the first terminal can activate the drift bottle function of the drift bottle application on the first terminal, and write the conversation information as the content of the random interaction data. The conversation information can include voice information, picture information, text information, and the like, or it can be a question inputted by the user of the first terminal. Then, the first terminal sends the random interaction data to a network server. At this point, the network server can receive the random interaction data sent by the first terminal. In addition, the first terminal may obtain the user attribute information and inputted question information of the user of the first terminal. The random interaction data may carry the user attribute information and the inputted question information. The user attribute information may include geographical location information, gender information, and the like of the user of the first terminal.

S102: The random interaction data is added to a resource pool, the random interaction data is obtained from the resource pool when a data obtaining request sent by a second terminal is received, and the random interaction data is sent to the second terminal via a first interface.

In a specific implementation, the second terminal is a user terminal other than the first user terminal 150 in FIG. 1. After receiving the random data of the first terminal, the network server may first check the information in the random interaction data to determine whether the random interaction data contains malicious information. If it is determined that the random interaction data does not contain malicious information, the random interaction data is added into the resource pool. If it is determined that the random interaction data contains malicious information, the random interaction data is filtered out. Further, the network server may determine whether the information in the random interaction data includes a preset keyword. If the information in the random interaction data includes the preset keyword, it is determined that the random interaction data includes malicious information; if the information in the random interaction data does not include the preset keyword, it is determined that the random interaction data does not include malicious information.

Optionally, the network server may check the user attribute information to determine whether the user of the random interaction data activates the random interaction data plug-in. If the user of the random interaction data has activated the random interaction data plug-in, the random interaction sent by the first terminal may be received, and the random interaction data may be added into the resource pool. If the user of the random interaction data does not activate the random interaction data plug-in, the user is prompted to activate the random interaction data plug-in. In addition, the network server can obtain the user attribute information carried in the random interaction data, and add the random interaction data to the resource pool according to the user attribute information. For example, random interaction data of one city may be delivered to another city, or random interaction data thrown by female users may be delivered to a male group. Moreover, by using the random interaction data carrying the user attribute information, other user terminals can conveniently view the user attribute information of the user of the first terminal after receiving the random interaction data.

Optionally, the network server can obtain a total number of the random interaction data items sent by the first terminal within a preset time period. When it is determined that the total number of the random interaction data items sent by the first terminal within the preset time period is less than a preset quota, the random interaction data is added into the resource pool, and the total number of the sent random interaction data items is increased by 1. When it is determined that the total number of the random interaction data items sent by the first terminal within the preset time period is not less than the preset quota, the random interaction data is no longer added to the resource pool, and prompt information is sent to the first terminal. The prompt information is used to remind the user to wait for a period of time to send out the random interaction data.

In addition, after the network server adds the random interaction data item sent by the first terminal into the resource pool, other user terminals can obtain the random interaction data item from the resource pool. When receiving the data obtaining request sent by the second terminal, the network server can obtain the random interaction data requested by the second terminal from the resource pool, and send the random interaction data to the second terminal via a first interface. The first interface is configured to complete data exchange with the user terminal.

Further, after obtaining the random interaction data from the resource pool and sending the random interaction data to the second terminal via the first interface, the network server can obtain the total number of the random interaction data items obtained from the resource pool by the second terminal within a preset time period. If the total number of the random interaction data items obtained by the second terminal within the preset time period exceeds the preset quota, the network server sends prompt information to the second terminal. The prompt information is used to remind the user of the second terminal to wait for a period of time before receiving the random interaction data again. If the total number of the random interaction data items obtained by the second terminal within the preset time period does not exceed the preset quota, the network server may prompt the user of the second terminal to obtain the random interaction data from the resource pool again.

In addition, after adding the random interaction data of the first terminal to the resource pool, the network server can check whether the user of the second terminal activates the random interaction data plug-in. If it is determined that the user of the second terminal does not activate the random interaction data plug-in, prompt information is sent to the second terminal. The prompt information is used to remind that the user of the second terminal does not have the function of obtaining the random interaction data from the resource pool and replying to random interaction data. If it is determined that the user of the second terminal activates the random interaction data plug-in, the user of the second terminal can obtain the random interaction data from the resource pool and reply to the random interaction data, and a user relationship between the user of the first terminal and the user of the second terminal is changed to a friend relationship after the second terminal replies to the random interaction data. In addition, the user attribute information of the user of the second terminal may be obtained. The random interaction data of the reply may carry user attribute information of the user of the second terminal, and after receiving the random interaction data of the reply, the user of the first terminal can view the user attribute information of the second terminal.

S103: Activating a second interface and send the random interaction data to an intelligent dialog system (also referred to as an intelligent service system) via the second interface when no reply for the random interaction data is received from the second terminal, the intelligent dialog system being configured to generate reply information according to at least the inputted conversation information and the user attribute information.

In a specific implementation, after the second terminal receives the random interaction data sent by the network server, it can be detected whether any reply information for the random interaction data is received from any second terminal. The total number of second terminals making no reply to the random interaction data after receiving the random interaction data is calculated. When the number of second terminals does not exceed a preset threshold, the total number of second terminals is continuously counted. When the number of second terminals exceeds the preset threshold, switching from the first interface to the second interface is triggered, and the random interaction data is sent to the intelligent dialog system via the second interface. The second interface is configured to complete data exchange with the intelligent dialog system. The intelligent dialog system may be an application client having information recognition and reply functions, or a server having information recognition and reply functions.

Optionally, whether a reply message of any second terminal for the random interaction data is received within a preset time threshold may be checked. When a reply message of any second terminal for the random interaction data is not received within a preset time threshold, switching from the first interface to the second interface is triggered, and the random interaction data is sent to the intelligent dialog system via the second interface. When a reply message of any second terminal for the random interaction data is received within a preset time threshold, the following steps are not performed.

S104: Receiving the reply information returned by the intelligent dialog system.

In a specific implementation, after receiving the random interaction data of the first terminal sent by the network server, the intelligent dialog system can generate the reply information according to the content of the random interaction data. Further, the content in the random interaction data can be recognized. Reply information corresponding to the content in the random interaction data may be retrieved from a preset semantic lexicon, and the found reply information is returned to the network server.

S105: Sending the reply information to the first terminal.

In a specific implementation, after receiving the reply information sent by the intelligent dialog system, the reply information may be sent to the first terminal. Thus, the user of the first terminal can view the reply information returned by the intelligent dialog system, and the first terminal may also continue to send random interaction data to the network server and receive reply information from the intelligent dialog system.

For example, the intelligent dialog system may be a virtual robot, and the random interaction data may be a message in the form of a message drift bottle. The first terminal sends a message drift bottle to the network server, the network server adds the message drift bottle in the resource pool, and no second terminal returns a reply message to the network server after obtaining the message drift bottle from the resource pool. Therefore, the network server may send the message drift bottle to the virtual robot. After receiving the message drift bottle, the virtual robot may return a reply message to the network server automatically. The reply message is forwarded to the first terminal by the network server, so that the message drift bottle sent by the first terminal is replied to.

In one embodiment of the present disclosure, first, the network server receives the random interaction data sent by the first terminal, and adds the random interaction data into the resource pool, and the second terminal obtains the random interaction data from the resource pool; then when the network server does not receive a reply message for the random interaction data from the second terminal, the random interaction data is sent to the intelligent dialog system, the intelligent dialog system being configured to generate the reply information at least according to the inputted question information and the user attribute information; finally, the network server receives the reply information returned by the intelligent dialog system, and sends the reply information to the first terminal. In this way, when no terminal responds to the random interaction data, the reply can be obtained by using the intelligent dialog system, thereby improving the reply rate to the random interaction data and increasing the frequency of dialogue using the random interaction data.

Figure 4:
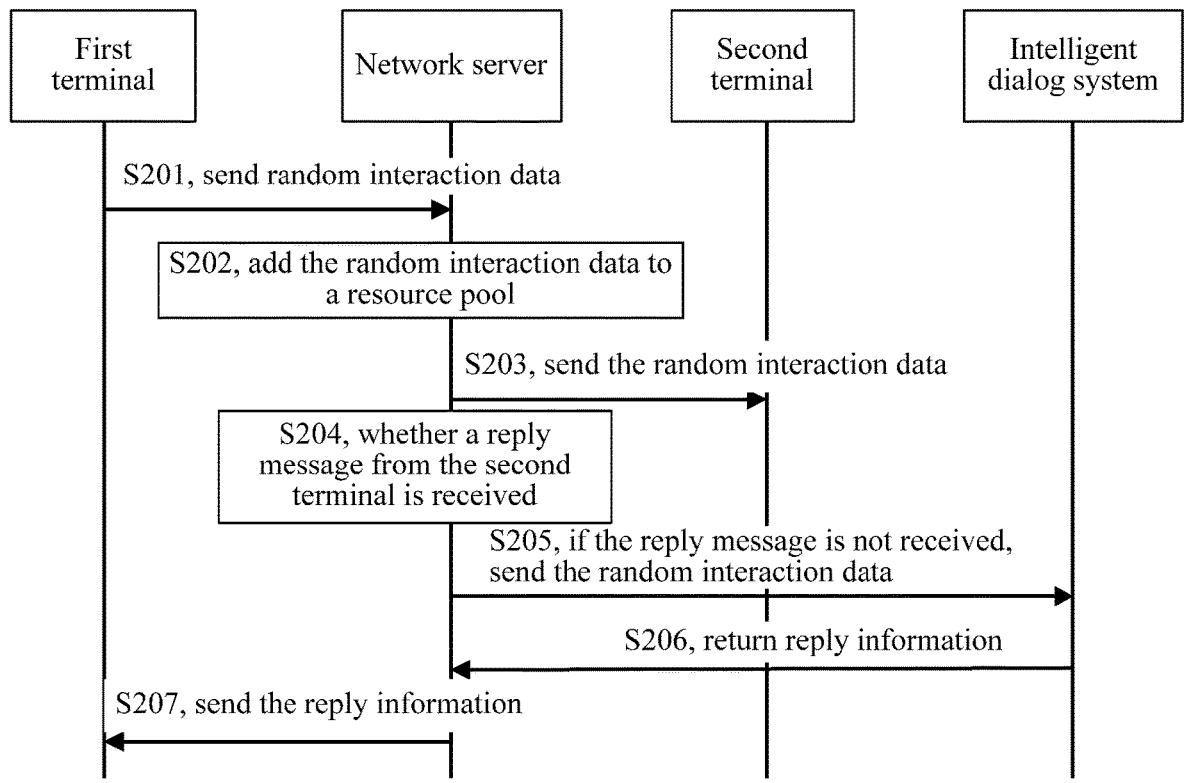
FIG. 4 is a flowchart of a method for processing random interaction data according to an embodiment of the present disclosure.

FIG. 4 is a flowchart of an embodiment of a method for processing random interaction data according to the present disclosure. As shown in FIG. 4, in one embodiment of the present disclosure, the method includes the followings.

S201: A first terminal sends random interaction data to a network server, the random interaction data carrying user attribute information of a user of the first terminal and inputted conversation information.

In a specific implementation, the user of the first terminal can activate the drift bottle function of a message drift bottle application on the first terminal, and write the conversation information as the content of the random interaction data. The conversation information can include voice information, picture information, text information, and the like, and can be question information inputted by the user of the first terminal. Then, the random interaction data is sent to the network server. At this time, the network server can receive the random interaction data sent by the first terminal. In addition, the first terminal may obtain the user attribute information and inputted question information of the user of the first terminal. The random interaction data may carry the user attribute information and the inputted question information. The user attribute information may include geographical location information, gender information, and the like of the user of the first terminal.

S202: The network server adds the random interaction data to a resource pool.

In a specific implementation, after receiving the random interaction data, the network server may first check the information in the random interaction data to determine whether the random interaction data contains malicious information. If it is determined that the random interaction data does not contain malicious information, the random interaction data is added into the resource pool. If it is determined that the random interaction data contains malicious information, the random interaction data is filtered out. Further, the network server may determine whether the information in the random interaction data includes a preset keyword. If the information in the random interaction data includes the preset keyword, it is determined that the random interaction data includes malicious information; if the information in the random interaction data does not include the preset keyword, it is determined that the random interaction data does not include malicious information.

Optionally, the network server may check the user attribute information to determine whether the user of the random interaction data activates the random interaction data plug-in. If the user of the random interaction data has activated the random interaction data plug-in, the random interaction sent by the first terminal may be received, and the random interaction data may be added into the resource pool. If the user of the random interaction data does not activate the random interaction data plug-in, the user is prompted to activate the random interaction data plug-in. In addition, the network server can obtain the user attribute information carried in the random interaction data, and add the random interaction data to the resource pool according to the user attribute information. For example, random interaction data of one city may be delivered to another city, or random interaction data thrown by female users may be delivered to a male group. Moreover, by using the random interaction data carrying the user attribute information, other user terminals can conveniently view the user attribute information of the user of the first terminal after receiving the random interaction data.

Optionally, the network server can obtain a total number of the random interaction data items sent by the first terminal within a preset time period. When it is determined that the total number of the random interaction data items sent by the first terminal within the preset time period is less than a preset quota, adding the random interaction data in the resource pool is performed, and the total number of the sent random interaction data items is increased by 1. When it is determined that the total number of the random interaction data items sent by the first terminal within the preset time period is not less than the preset quota, the random interaction data is no longer added to the resource pool, and prompt information is sent to the first terminal. The prompt information is used to remind the user to wait for a period of time to deliver the random interaction data.

S203: The second terminal obtains the random interaction data from the resource pool.

In a specific implementation, after the network server adds the random interaction data of the first terminal to the resource pool, other user terminals can obtain the random interaction data from the resource pool. When receiving a data obtaining request sent by the second terminal, the network server can obtain the random interaction data requested by the second terminal from the resource pool, and send the random interaction data to the second terminal via a first interface, where the first interface is configured to complete data exchange with the user terminal.

Further, after obtaining the random interaction data from the resource pool and sending the random interaction data to the second terminal via the first interface, the network server can obtain the total number of the random interaction data items obtained from the resource pool by the second terminal within a preset time period. If the total number of the random interaction data items obtained by the second terminal within the preset time period exceeds the preset quota, the network server sends prompt information to the second terminal. The prompt information is used to remind the user of the second terminal to wait for a period of time before receiving the random interaction data again. If the total number of the random interaction data items obtained by the second terminal within the preset time period does not exceed the preset quota, the network server may prompt the user of the second terminal to obtain the random interaction data from the resource pool again.

In addition, after adding the random interaction data of the first terminal to the resource pool, the network server can check whether the user of the second terminal activates the random interaction data plug-in. If it is determined that the user of the second terminal does not activate the random interaction data plug-in, prompt information is sent to the second terminal. The prompt information is used to remind that the user of the second terminal does not have the function of obtaining the random interaction data from the resource pool and replying to random interaction data. If it is determined that the user of the second terminal activates the random interaction data plug-in, the user of the second terminal can obtain the random interaction data from the resource pool and reply to the random interaction data, and a user relationship between the user of the first terminal and the user of the second terminal is changed to a friend relationship after the second terminal replies to the random interaction data. In addition, the user attribute information of the user of the second terminal may be obtained. The reply to the random interaction data may carry user attribute information of the user of the second terminal, and after receiving the reply to the random interaction data, the user of the first terminal can view the user attribute information of the second terminal.

S204: The network server detects whether a reply or a reply message of the second terminal for the random interaction data is received.

S205. When the network server does not receive the reply message of the second terminal for the random interaction data, a second interface is activated, and the random interaction data is sent to an intelligent dialog system via the second interface. The intelligent dialog system may be an application client having information recognition and reply functions, or a server having information recognition and reply functions.

In a specific implementation, after the second terminal receives the random interaction data sent by the network server, the network server can detect whether the reply information for the random interaction data is received the second terminal, and count a number of second terminals making no reply to the random interaction data after receiving the random interaction data. When the number of the second terminals does not exceed a preset threshold, the number of the second terminals is continuously counted. When the number of the second terminals exceeds the preset threshold, the network server switches from the first interface to the second interface, and the random interaction data is sent to the intelligent dialog system via the second interface. The second interface is configured to complete data exchange with the intelligent dialog system. The intelligent dialog system may be an application client having information recognition and reply functions, or a server having information recognition and reply functions.

Optionally, the network server may check whether a reply message of the second terminal for the random interaction data is received within a preset time threshold. When a reply message of the second terminal for the random interaction data is not received within a preset time threshold, switching from the first interface to the second interface is triggered, and the random interaction data is sent to the intelligent dialog system via the second interface. When a reply message of the second terminal for the random interaction data is received within a preset time threshold, the following steps are not performed.

S206: The intelligent dialog system generates reply information according to the inputted question information and the user attribute information, and returns the reply information to the network server.

In a specific implementation, after receiving the random interaction data of the first terminal sent by the network server, the intelligent dialog system can generate the reply information according to the content of the random interaction data. Further, semantic content of the random interaction data may be recognized; personalized information is obtained according to the user attribute information; and the reply information is generated according to the semantic content and the personalized information, where the personalized information may include the user attribute information. For example, reply information corresponding to the content in the random interaction data may be retrieved from a preset semantic lexicon, and the found reply information is returned to the network server. The semantic content of the random interaction data may be recognized by using the following method: first, the content in the random interaction data is processed by means of word segmentation, synonym expansion, meaningless word filtering, and the like; and then a keyword matching method is used to determine the sentence type of the content of the random interaction data (for example, negative sentence, question sentence, and the like); finally, the information category or field of the content in the random interaction data is determined by using a preset rule and a classifier, where the preset rule includes a template of a plurality of regular expressions.

S207: The network server sends the reply information to the first terminal.

In a specific implementation, after receiving the reply information sent by the intelligent dialog system, the network server may send the reply information to the first terminal, so that the user of the first terminal can view the reply information returned by the intelligent dialog system. The first terminal can also continue to send the random interaction data to the network server, and receive the reply information returned by the intelligent dialog system.

In one embodiment of the present disclosure, first, the network server receives the random interaction data sent by the first terminal, and adds the random interaction data into the resource pool, and the second terminal obtains the random interaction data from the resource pool; then when the network server does not obtain the reply message of the second terminal for the random interaction data, the random interaction data is sent to the intelligent dialog system, the intelligent dialog system being configured to generate the reply information at least according to the inputted conversation information and user attribute information; finally, the network server receives the reply information returned by the intelligent dialog system, and sends the reply information to the first terminal. In this way, when no terminal responds to the random interaction data, the reply can be obtained by using the intelligent dialog system, thereby improving the reply rate to the random interaction data and increasing the frequency of dialogue using the random interaction data.

Figure 5:
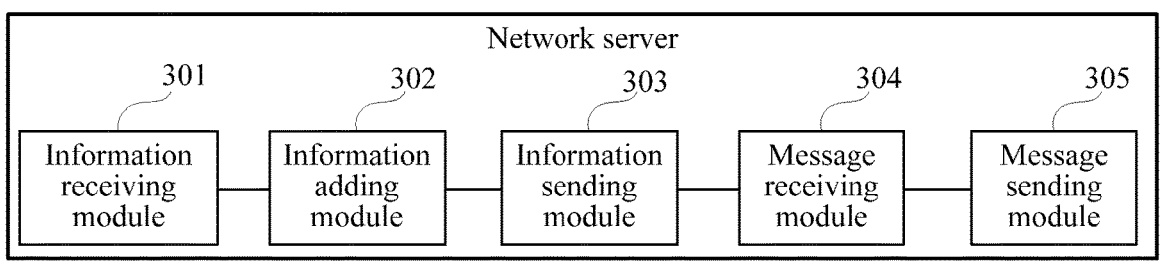
FIG. 5 is a schematic structural diagram of a network server according to an embodiment of the present disclosure.

FIG. 5 is a schematic structural diagram of a network server according to an embodiment of the present disclosure. As shown in FIG. 5, the network server in the embodiment of the present disclosure includes an information receiving module 301, an information adding module 302, an information sending module 303, a message receiving module 304, and a message sending module 305.

The information receiving module 301 is configured to receive random interaction data sent by a first terminal, the random interaction data carrying user attribute information of a user of the first terminal and inputted conversation information.

In a specific implementation, the user of the first terminal can activate the drift bottle function of a message drift bottle application on the first terminal, and write the conversation information as the content of the random interaction data. The conversation information can include voice information, picture information, text information, and the like, and can be question information inputted by the user of the first terminal. Then, the random interaction data is sent to the network server. At this time, the information receiving module 301 of the network server can receive the random interaction data sent by the first terminal. In addition, the first terminal may obtain the user attribute information and inputted question information of the user of the first terminal. The random interaction data may carry the user attribute information and the inputted question information. The user attribute information may include geographical location information, gender information, and the like of the user of the first terminal.

The information adding module 302 is configured to add the random interaction data into a resource pool, obtain the random interaction data from the resource pool when receiving a data obtaining request sent by the second terminal, and send the random interaction data to the second terminal via a first interface.

In a specific implementation, after the information adding module 302 of the network server receives the random data of the first terminal, first the information in the random interaction data is checked to determine whether the random interaction data contains malicious information. If it is determined that the random interaction data does not contain malicious information, the random interaction data is added into the resource pool. If it is determined that the random interaction data contains malicious information, the random interaction data is filtered out. Further, the information adding module 302 of the network server may determine whether the information in the random interaction data includes a preset keyword. If the information in the random interaction data includes the preset keyword, it is determined that the random interaction data includes malicious information; if the information in the random interaction data does not include the preset keyword, it is determined that the random interaction data does not include malicious information.

Optionally, the information loading module 302 of the network server may check the user attribute information to determine whether the user of the random interaction data activates the random interaction data plug-in. If the user of the random interaction data has activated the random interaction data plug-in, the random interaction sent by the first terminal may be received, and the random interaction data may be added into the resource pool. If the user of the random interaction data does not activate the random interaction data plug-in, the user is prompted to activate the random interaction data plug-in. In addition, the information adding module 302 of the network server can obtain the user attribute information carried in the random interaction data, and add the random interaction data to the resource pool according to the user attribute information. For example, random interaction data of one city may be delivered to another city, or random interaction data thrown by female users may be delivered to a male group. Moreover, by using the random interaction data carrying the user attribute information, other user terminals can conveniently view the user attribute information of the user of the first terminal after receiving the random interaction data.

Optionally, the information adding module 302 of the network server can obtain a total number of the random interaction data items sent by the first terminal within a preset time period. When it is determined that the total number of the random interaction data items sent by the first terminal within the preset time period is less than a preset quota, adding the random interaction data in the resource pool is performed, and the total number of the sent random interaction data items is increased by 1. When it is determined that the total number of the random interaction data items sent by the first terminal within the preset time period is not less than the preset quota, the random interaction data is no longer added to the resource pool, and prompt information is sent to the first terminal. The prompt information is used to remind the user to wait for a period of time to deliver the random interaction data.

In addition, after the information adding module 302 of the network server adds the random interaction data of the first terminal to the resource pool, other user terminals can obtain the random interaction data from the resource pool. When receiving the data obtaining request sent by the second terminal, the information adding module 302 of the network server can obtain the random interaction data requested by the second terminal from the resource pool, and send the random interaction data to the second terminal via a first interface, where the first interface is configured to complete data exchange with the user terminal.

Further, after obtaining the random interaction data from the resource pool and sending the random interaction data to the second terminal via the first interface, the information adding module 302 of the network server can obtain the total number of the random interaction data items obtained from the resource pool by the second terminal within a preset time period. If the total number of the random interaction data items obtained by the second terminal within the preset time period exceeds the preset quota, the network server sends prompt information to the second terminal. The prompt information is used to remind the user of the second terminal to wait for a period of time before receiving the random interaction data again. If the total number of the random interaction data items obtained by the second terminal within the preset time period does not exceed the preset quota, the network server may prompt the user of the second terminal to obtain the random interaction data from the resource pool again.

In addition, after adding the random interaction data of the first terminal to the resource pool, the information adding module 302 of the network server can check whether the user of the second terminal activates the random interaction data plug-in. If it is determined that the user of the second terminal does not activate the random interaction data plug-in, prompt information is sent to the second terminal. The prompt information is used to remind that the user of the second terminal does not have the function of obtaining the random interaction data from the resource pool and replying to random interaction data. If it is determined that the user of the second terminal activates the random interaction data plug-in, the user of the second terminal can obtain the random interaction data from the resource pool and reply to the random interaction data, and a user relationship between the user of the first terminal and the user of the second terminal is changed to a friend relationship after the second terminal replies to the random interaction data. In addition, the user attribute information of the user of the second terminal may be obtained. The reply to the random interaction data may carry user attribute information of the user of the second terminal, and after receiving the reply to the random interaction data, the user of the first terminal can view the user attribute information of the second terminal.

The information sending module 303 is configured to: activate a second interface and send the random interaction data to an intelligent dialog system via the second interface when no reply message for the random interaction data is received from the second terminal, the intelligent dialog system being configured to generate reply information according to at least the inputted conversation information and the user attribute information.

In a specific implementation, after the second terminal receives the random interaction data sent by the network server, the network server can detect whether the reply information for the random interaction data is received from the second terminal, and a total number of second terminals making no reply to the random interaction data after receiving the random interaction data is counted. When the number of the second terminals does not exceed a preset threshold, the number of the second terminals is continuously counted. When the number of the second terminals exceeds the preset threshold, the information sending module 303 triggers switching from the first interface to the second interface, and sends the random interaction data to the intelligent dialog system via the second interface. The second interface is configured to complete data exchange with the intelligent dialog system. The intelligent dialog system may be an application client having information recognition and reply functions, or a server having information recognition and reply functions.

Optionally, whether a reply message of the second terminal for the random interaction data is received within a preset time threshold may be checked. When a reply message of the second terminal for the random interaction data is not received within a preset time threshold, switching from the first interface to the second interface is triggered, and the random interaction data is sent to the intelligent dialog system via the second interface. When a reply message of the second terminal for the random interaction data is received within a preset time threshold, the following steps are not performed.

The message receiving module 304 is configured to receive the reply information returned by the intelligent dialog system.

In a specific implementation, after receiving the random interaction data, the intelligent dialog system may generate the reply information according to the contents of the random interaction data. Further, the content in the random interaction data can be recognized. Reply information corresponding to the content in the random interaction data may be retrieved from a preset semantic lexicon, and the found reply information is returned to the network server. The message receiving module 304 in the server receives the reply information returned by the intelligent dialog system.

The message sending module 305 is configured to send the reply information to the first terminal.

In a specific implementation, after receiving the reply information sent by the intelligent dialog system, the message sending module 305 may send the reply information to the first terminal. Thus, the user of the first terminal can view the reply information returned by the intelligent dialog system, and the first terminal may also continue to send random interaction data to the network server and receive reply information from the intelligent dialog system.

For example, the intelligent dialog system may be a virtual robot, and the random interaction data may be a message drift bottle. The first terminal sends the message drift bottle to the network server, the network server adds the message drift bottle to the resource pool, and no second terminal returns a reply message to the network server after obtaining the message drift bottle from the resource pool. Therefore, the network server may send the message drift bottle to the virtual robot. After receiving the message drift bottle, the virtual robot may return a reply message to the network server automatically. The reply message is forwarded to the first terminal by the network server, so that the message drift bottle sent by the first terminal is replied.

In one embodiment of the present disclosure, first, the network server receives the random interaction data sent by the first terminal, and adds the random interaction data into the resource pool, and the second terminal obtains the random interaction data from the resource pool; then when the network server does not receive a reply message for the random interaction data from the second terminal, the random interaction data is sent to the intelligent dialog system, the intelligent dialog system being configured to generate the reply information at least according to the inputted question information and the user attribute information; finally, the network server receives the reply information returned by the intelligent dialog system, and sends the reply information to the first terminal. In this way, when no terminal responds to the random interaction data, the reply can be obtained by using the intelligent dialog system, thereby improving the reply rate to the random interaction data and increasing the frequency of dialogue using the random interaction data.

Figure 6:
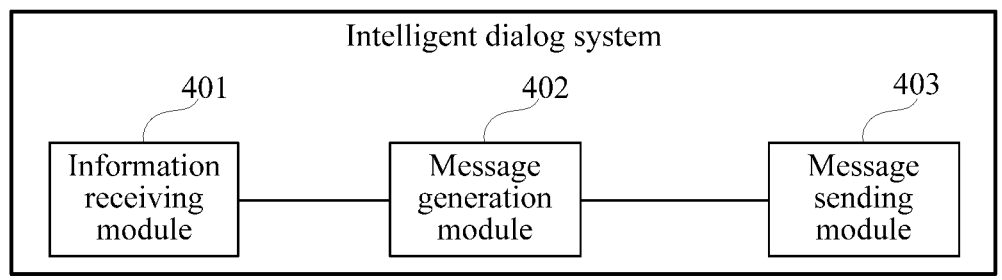
FIG. 6 is a schematic structural diagram of an intelligent dialog system according to an embodiment of the present disclosure.

FIG. 6 is a schematic structural diagram of an intelligent dialog system according to an embodiment of the present disclosure. As shown FIG. 6, the intelligent dialog system in the embodiment of the present disclosure includes an information receiving module 401, a message generation module 402, and a message sending module 403.

The information receiving module 401 is configured to receive random interaction data sent by a network server, the random interaction data carrying user attribute information of a user of a first terminal and inputted conversation information, where the random interaction data is sent by the first terminal to the network server, and is obtained from a resource pool when the network server receives a data obtaining request sent by a second terminal; the random interaction data is sent to the second terminal via a first interface when the network server receives no reply message of the second terminal for the random interaction data.

In specific implementation, the first terminal sends the random interaction data to the network server, the network server adds the random interaction data to the resource pool, the second terminal sends the data obtaining request to the network server, and the network server obtains the random interaction data from the resource pool and sends the random interaction data to the second terminal. The network server detects whether a reply message of the second terminal for the random interaction data is received, and sends the random interaction data to the intelligent dialog system when it is detected that the reply message of the second terminal for the random interaction data is not received. The intelligent dialog system may be an application client having information recognition and reply functions, or a server having information recognition and reply functions.

The message generation module 402 is configured to generate reply information according to content in the random interaction data.

In a specific implementation, the message generation module 402 may recognize semantic content in the random interaction data, obtain personalized information according to the user attribute information, and generate the reply information according to the semantic content and the personalized information, where the personalized information may include the user attribute information. For example, reply information corresponding to the content in the random interaction data may be retrieved from a preset semantic lexicon, and the found reply information is returned to the network server. The semantic content of the random interaction data may be recognized by using the following method: first, the content in the random interaction data is processed by means of word segmentation, synonym expansion, meaningless word filtering, and the like; and then a keyword matching method is used to determine the sentence type of the content of the random interaction data (for example, negative sentence, question sentence, and the like); finally, the information category or field of the content in the random interaction data is determined by using a preset rule and a classifier, where the preset rule includes a template of a plurality of regular expressions.

The message sending module 403 is configured to send the reply information to the network server, so that the network server forwards the reply information to the first terminal.

In a specific implementation, after receiving the reply information sent by the intelligent dialog system, the network server may send the reply information to the first terminal, so that the user of the first terminal can view the reply information returned by the intelligent dialog system. The first terminal can also continue to send the random interaction data to the network server, and receive the reply information returned by the intelligent dialog system.

According to one embodiment of the present disclosure, first, when the network server does not receive a reply message for the random interaction data from the second terminal, the intelligent dialog system receives the random interaction data sent by the network server, and generates the reply information according to the content of the random interaction data, and finally, the reply information is sent to the network server so that the network server forwards the reply information to the first terminal, thereby improving the reply rate to the random interaction data and increasing the frequency of dialogue using the random interaction data.

Figure 7:
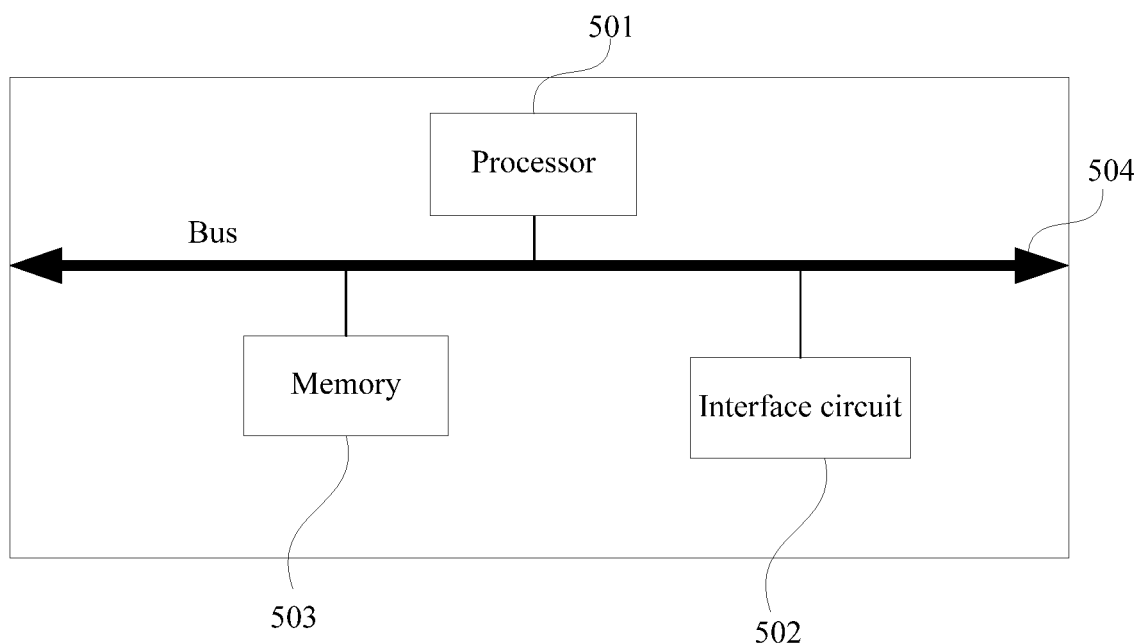
FIG. 7 is a schematic structural diagram of an apparatus for processing random interaction data according to an embodiment of the present disclosure.

FIG. 7 is a schematic structural diagram of an apparatus for processing random interaction data according to an embodiment of the present disclosure. As shown in FIG. 7, the apparatus may include at least one processor 501, such as a CPU, at least one interface circuit 502, at least one memory 503, and at least one bus 504. The communication bus 504 is configured to implement connection and communication between these components. The interface circuit 502 in the embodiment of the present disclosure may be a wired transmission port, or a wireless device, for example, including an antenna device, for performing signaling or data communication with other node devices. The memory 503 may be a high speed RAM memory or a non-volatile memory such as at least one magnetic disk memory. The memory 503 may also optionally be at least one memory device located far away from the processor 501.

A set of program code is stored in the memory 503, and the processor 501 is configured to call the program code stored in the memory for performing the following operations: receiving random interaction data sent by a first terminal, the random interaction data carrying user attribute information of a user of the first terminal and inputted conversation information; adding the random interaction data to a resource pool, obtaining the random interaction data from the resource pool when a data obtaining request sent by a second terminal is received, and sending the random interaction data to the second terminal via a first interface; activating a second interface and sending the random interaction data to an intelligent dialog system via the second interface when no reply message for the random interaction data is received from the second terminal, the intelligent dialog system being configured to generate reply information according to at least the inputted conversation information and the user attribute information; receiving the reply information returned by the intelligent dialog system; and sending the reply information to the first terminal.

The processor 501 is further configured to perform the followings: counting a number of the second terminals making no reply to the random interaction data after a plurality of second terminals receive the random interaction data; and triggering switching from the first interface to the second interface and sending the random interaction data to the intelligent dialog system via the second interface when the number of the second terminals exceeds a preset threshold.

The processor 501 is further configured to perform the followings: triggering switching from the first interface to the second interface and sending the random interaction data to the intelligent dialog system via the second interface when no reply message for the random interaction data is received from the second terminal within a preset time threshold.

The processor 501 is further configured to perform the followings: adding the random interaction data to the resource pool according to the user attribute information of the user of the first terminal.

The processor 501 is further configured to perform the followings: obtaining a total number of the random interaction data items that is sent by the first terminal within a preset time period; and adding the random interaction data to a resource pool when it is determined that the total number of the random interaction data items that is sent by the first terminal within the preset time period is less than a preset quota.

It should be noted that in each of the foregoing method embodiments, for the sake of simple description, the embodiments are all expressed as a series of action combinations. Those skilled in the art should understand that the present disclosure is not limited by the described sequence of actions. According to the present disclosure, certain steps may be performed in other orders or simultaneously. Second, those skilled in the art should also understand that the embodiments described in the specification are all preferred embodiments, and the involved actions and modules are not necessarily required by the present disclosure.

In the foregoing embodiments, the description of each embodiment has its own emphasis. For the part that is not described in detail in an embodiment, reference may be made to the relevant description of other embodiments.

During the actual conversation between a user and a chat robot or chat bot, it may be difficult for the chat bot to accurately understand the context of the conversation, nor to remember the user's preferences and other factors. Therefore, a smooth and reasonable conversation between the chat bot and the user cannot be achieved. The reason for the obstacle between the chat bot and the user is that it is impossible to collect enough real chat corpus in enough fields. In reality, the scale of real chat corpus is small, and it is not convenient to use the chat corpus directly due to privacy. Therefore, the collection of chat corpus has become the bottleneck of the development of chat bots.

The method for processing random interaction data, the conversation server, and the intelligent dialog system provided in the embodiments of the present disclosure collect chat corpus of the intelligent dialog system by means of crowdsourcing. Therefore, the chat corpus can be widely and conveniently obtained, and the obtained chat corpus can be easily used without privacy concern.

Figure 8:
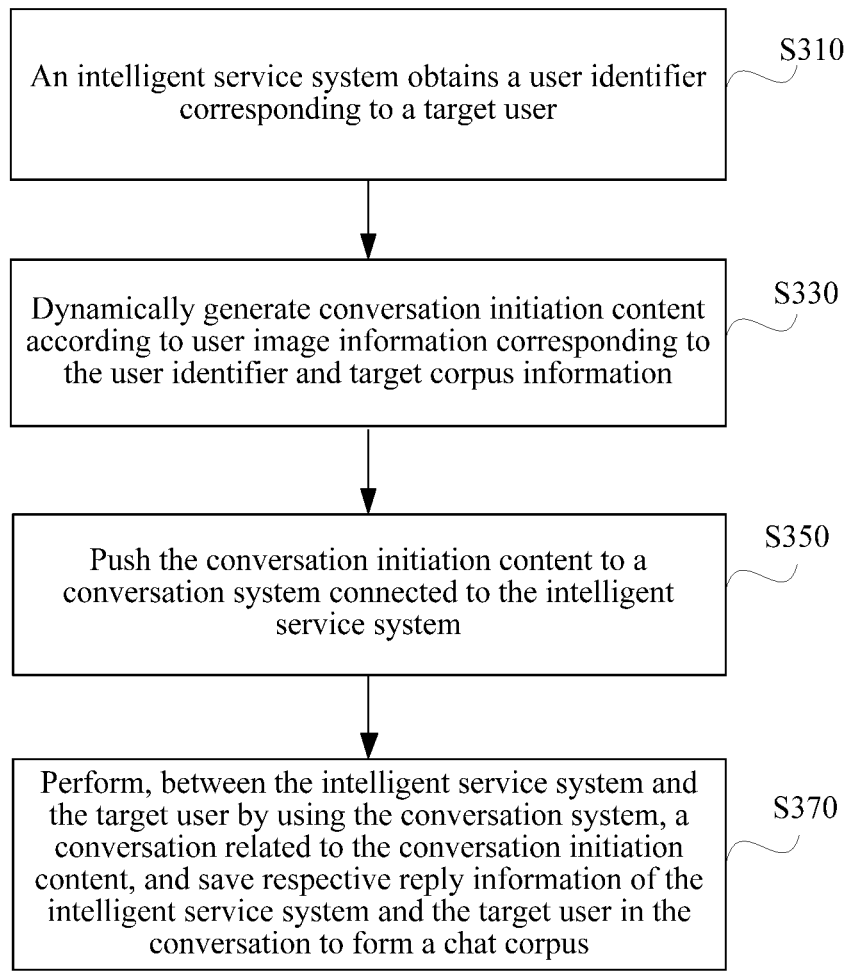
FIG. 8 is a flowchart of a chat corpus collection method applied to an intelligent service system according to an exemplary embodiment.

FIG. 8 is a flowchart of a chat corpus collection method according to an embodiment of the present disclosure. The chat corpus collection method is applied to the intelligent service system 110 in the implementation environment shown in FIG. 1. As shown in FIG. 8, the chat corpus collection method may be executed by the intelligent service system 110, and may include the following steps.

In step S310, the intelligent service system obtains a user identifier corresponding to a target user.

The intelligent service system refers to a machine that runs chat bot software and has a dialogue function. The target user is a user who has a conversation with the intelligent service system. The target user can be selected among many users. For example, the target user may be the user sending out the message drift bottle on the first terminal.

In step S330, conversation initiation content is dynamically generated according to user image information corresponding to the user identifier and target corpus information.

The user identifier is used to uniquely identify a user. The user image information includes at least information such as attributes of the user. Each user has the user image information uniquely corresponding to the user identifier. The user image information is used to represent situations of the user in various aspects, so that the user is depicted in the form of information.

The target corpus information is preset by the intelligent service system according to the required content of the chat corpus. In one exemplary embodiment, the target corpus information may be a target corpus type. For example, the target corpus type may be a sports type or a food type.

The intelligent service system generates the conversation initiation content according to the user image information and the target corpus information. It can be seen that the generated conversation initiation content matches the user image information and the target corpus information.

In one aspect, the conversation initiation content generated in this manner is consistent with the situation of the target user. Therefore, the effectiveness of the subsequent conversation initiation content pushing is improved, that is, the subsequent conversation initiation content pushed to the target user can attract or be interesting to the target user.

Therefore, the probability of receiving responses from the user is greatly increased, and the conversation initiation content generated in this way can help promote the chat corpus collection.

In another aspect, the conversation initiation content generated in this way is consistent with the target corpus information, which ensures that the finally collected chat corpus is the true requirement of the intelligent service system. Therefore, the targeted chat corpus collected can be realized.

In step S350, the conversation initiation content is pushed to a conversation system connected to the intelligent service system.

It should be noted that the conversation system is a system with a conversation function, which can implement the conversation between users or even between a user and the intelligent service system. In an embodiment of the present disclosure, the conversation system may be an anonymous conversation system.

Numerous users are connected to the conversation system, and in order to implement corpus collection of the intelligent service system, the intelligent service system is also connected to the conversation system.

The conversation initiation content generated by the intelligent service system for the target user may be used to start the conversation between the intelligent service system and the target user.

Specifically, the intelligent service system pushes the conversation initiation content generated by the intelligent service system to the conversation system, and uses the conversation system as a transit point to push the conversation initiation content to the terminal of the target user, thereby initiating the conversation between the intelligent service system and the target user.

In step S370, the intelligent service system performs a conversation related to the conversation initiation content between intelligent service system and the target user by using the conversation system, and saves respective reply information of the intelligent service system and the target user in the conversation to form a chat corpus.

As the conversation continues, the reply information contains the reply information of the intelligent service system to the target user, that is, personalized reply information generated by the intelligent service system and returned to the target user, and also contains user reply information sent by the target user according to the personalized reply information of the intelligent service system. Therefore, the reply information includes the personalized reply information and the user reply information.

Under the action of the conversation system, the intelligent service system has a conversation with the target user. At this point, the intelligent service system continuously receives the user reply information of the target user, and continuously generates the personalized reply information according to the user reply information of the target user and sends the generated personalized reply information to the target user.

The conversation initiation content, the user reply information of the target user, and the personalized reply information of the intelligent service system form the context of the dialogue between the intelligent service system and the target user according to their respective time sequence, namely, the chat record. The chat record can be used as the chat corpus of the intelligent service system.

Through the process described above, the conversation between the intelligent service system and the target user is realized, and then the chat corpus collection of the intelligent service system is implemented based on the conversation. As the conversation system has many users, a plurality of users can be selected as the target users, thereby implementing the conversation between the intelligent service system and the plurality of target users. In this way, quick chat corpus collection is achieved, effectively improving the chat corpus collection efficiency.

It should to be specifically noted here that the conversation initiation content and reply information may be in the form of text, but is not limited thereto, and may also be in the form of speech or picture.

According to the description of the details of step S310 shown in an embodiment of the present disclosure, step S310 may include the following steps.

The intelligent service system receives a user identifier returned by the conversation system to the intelligent service system through target user selection. The user identifier corresponds to the target user.

The conversation system selects the target user, and after completing the selection of the target user, the conversation system returns the user identifier corresponding to the target user to the intelligent service system.

After receiving the user identifier returned by the conversation system, the intelligent service system performs the chat corpus collection from the target user corresponding to the user identifier.

In this way, the intelligent service system can implement chat corpus collection by means of the conversation system, thereby facilitating the collection of enough real chat corpus in enough fields.

Figure 9:
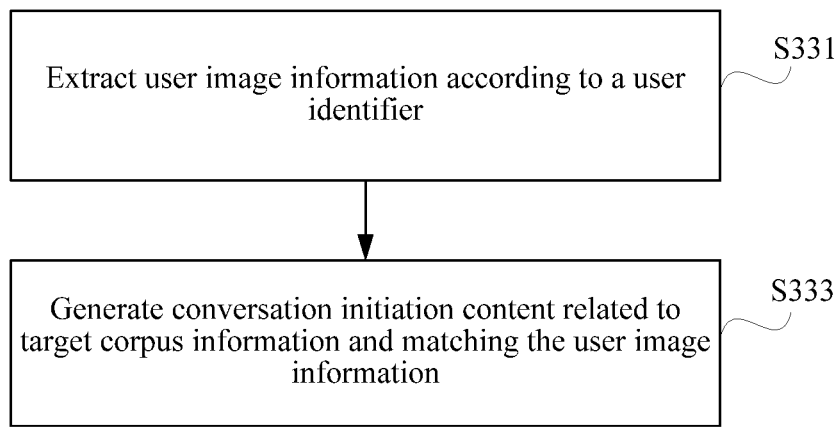
FIG. 9 is a flowchart of a step of dynamically generating conversation initiation content according to user image information corresponding to a user identifier and target corpus information in the embodiment corresponding to FIG. 8.

FIG. 9 depicts the details of step S330 shown in an embodiment of the present disclosure. As shown in FIG. 9, step S330 may include the following steps.

In step S331, the user image information is extracted according to the user identifier.

As described above, the user image information includes at least the user attribute information, for example, city, gender, and age of the user. The user image information is stored with the user identifier as an index.

Therefore, after obtaining the user identifier corresponding to the target user returned by the conversation system, the user image information is searched for according to the user identifier, and the user image information corresponding to the user identifier is extracted.

In step S333, conversation initiation content that is related to target corpus information and matches the user image information is generated.

The conversation initiation content is dynamically generated to obtain the conversation initiation content that is related to the target corpus information and matches the user image information. The conversation initiation content is not constant, thereby improving the adaptability of the chat corpus collection.

For example, for a female target user under the age of 35, conversation initiation content related to emotion and work is generated.

For another example, the preset target corpus information includes a food type and a sports type, that is, it is desired to collect chat corpus related to food and chat corpus related to sports.

At this time, for a target user who is indicated as female in the user image information, conversation initiation content related to food is generated; and for a target user who is indicated as male in the user image information, conversation initiation content related to sports is generated.

Figure 10:
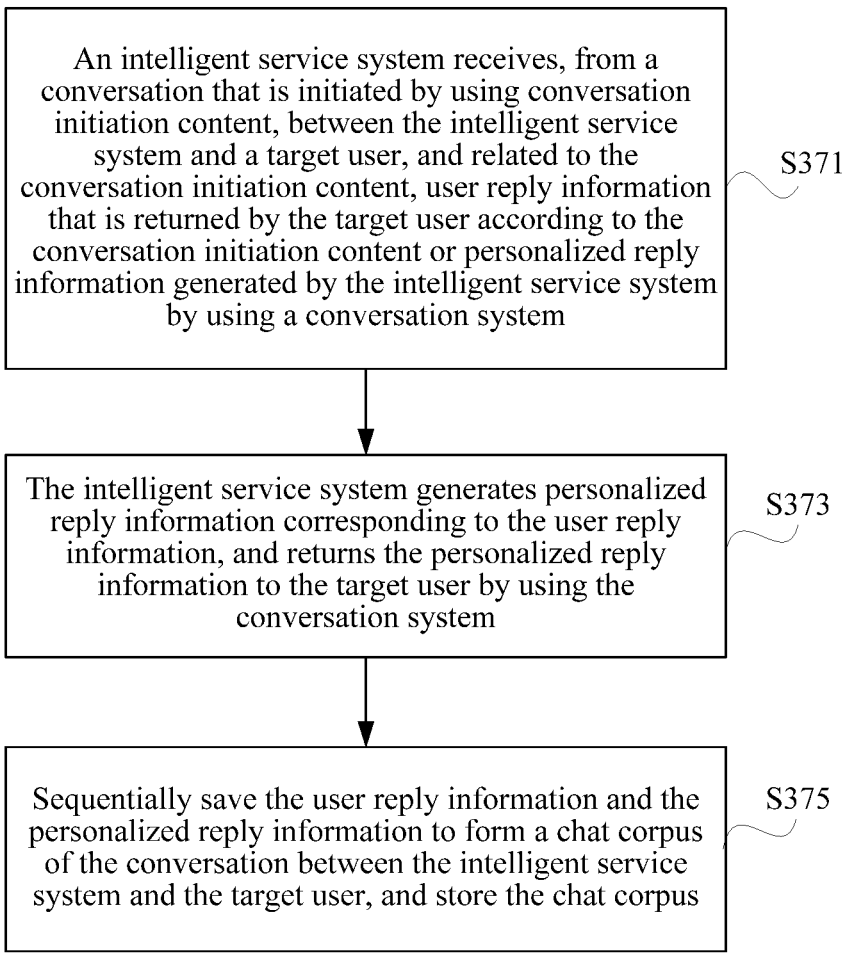
FIG. 10 is a flowchart of a step of performing, by the intelligent service system between the intelligent service system and a target user by using a conversation system, a conversation related to the conversation initiation content, and saving respective reply information of the intelligent service system and the target user in the conversation to form a chat corpus in the embodiment corresponding to FIG. 8.

FIG. 10 depicts the details of step S370 shown in an embodiment of the present disclosure. As shown in FIG. 10, step S370 may include the following steps.

In step S371, in a conversation related to conversation initiation content between the intelligent service system and the target user initiated by using the conversation initiation content, the intelligent service system receives, through the conversation system, the user reply information returned by the target user according to the conversation initiation content or the personalized reply information generated by the intelligent service system In the ongoing conversation between the intelligent service system and the target user, the intelligent service system receives the user reply information returned by the target user. The user reply information corresponds to the conversation initiation content or the personalized reply information.

In step S373, the intelligent service system generates personalized reply information corresponding to the user reply information, and returns the personalized reply information to the target user through the conversation system.

The intelligent service system processes and semantically retrieves the user reply information to generate the personalized reply information corresponding to the user reply information.

Figure 11:
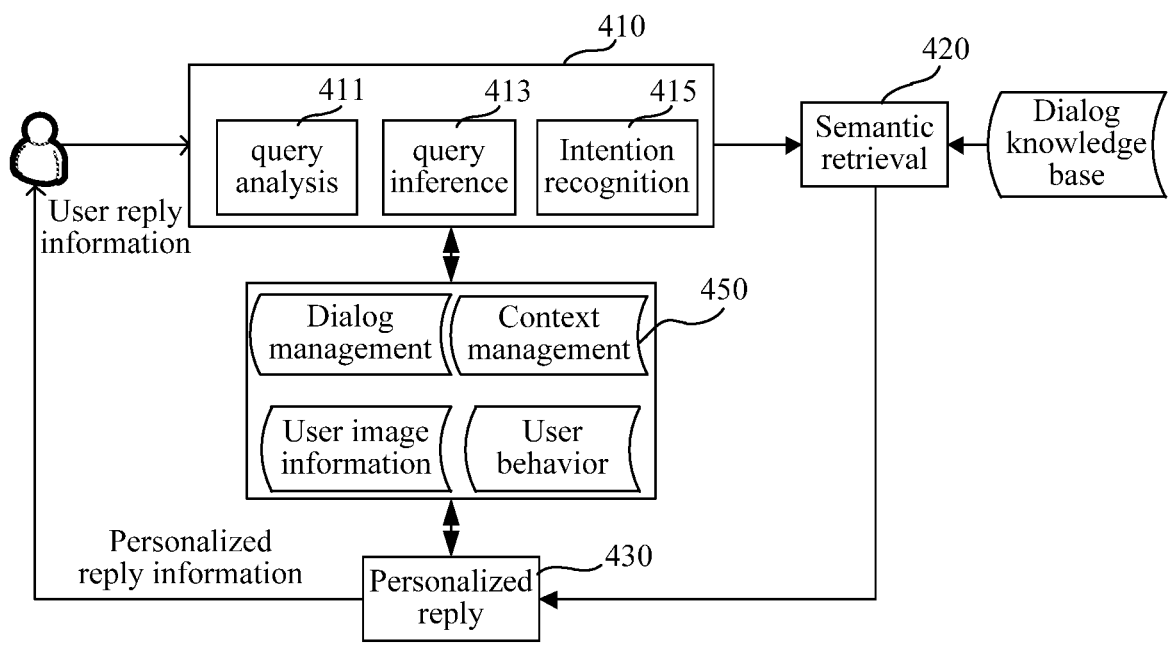
FIG. 11 is a flowchart illustrating a process for processing user reply information, and obtaining personalized reply information through semantic retrieval according to an embodiment of the present disclosure.

Specifically, FIG. 11 is flowchart illustrating a process for processing user reply information, and obtaining personalized reply information through semantic retrieval according to an embodiment of the present disclosure.

As shown in FIG. 11, after receiving the user reply information returned by the target user through the conversation system, the intelligent service system first processes the user reply information, that is, step 410 is performed, which specifically includes query (retrieval keyword) analysis 411, query inference 413 and intention recognition 415. Then, a semantic retrieval using the obtained processing result can be performed, that is, step 420, so as to retrieve and obtain the answer to the user reply information.

The query analysis refers to the process of word segmentation, synonym expansion, and meaningless word filtering of the user reply information; the query inference is a basic determination to find whether the user reply information is a negative sentence, a question sentence or the like. The process can be achieved through keyword matching. The intention recognition is to determine the category and field of the user reply information, and this process can be achieved through a preset rule and a classifier. The preset rule is a template of regular expressions, and a trial is conducted to match the template of regular expressions. The classifier is a model trained by machine learning methods.

After processing of the user reply information is completed, that is, after step 410, a semantic detection step, that is, step 420 is performed. The corresponding answer is searched for in a dialogue knowledge base. Multiple answers may be found. At this time, the answers may be scored and sorted so as to finally obtain the answer with the highest score. The answer is used to make a personalized reply. Then, step 430 is performed, that is, personalized reply information is generated and returned to the target user.

In the implementation of this process, the data module 450 composed of user image information, user behaviors, dialog management, and context management may be used as a support to ensure the continuity of the dialogue.

In step S375, the user reply information and the personalized reply information are sequentially stored, forming a chat corpus of the conversation between the intelligent service system and the target user, and the chat corpus is stored.

The user reply information and the personalized reply information that are obtained sequentially in a certain time sequence are sequentially saved to form a complete chat record, and the chat record can be stored as the chat corpus.

Figure 12:
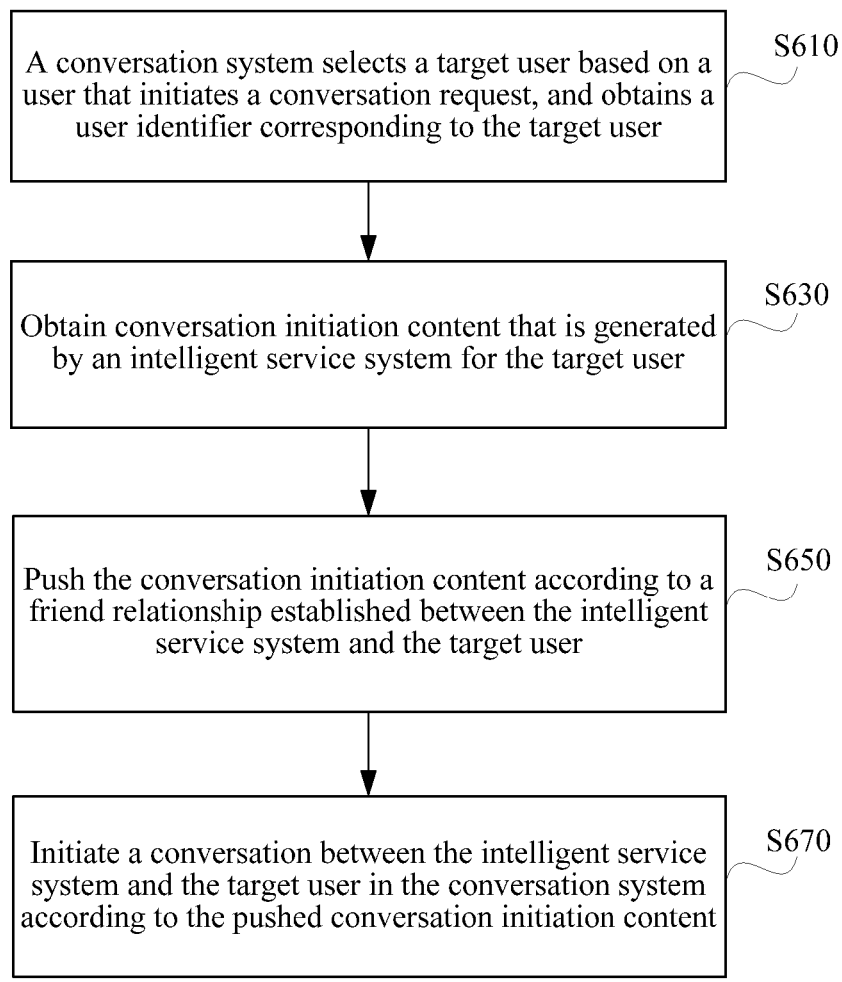
FIG. 12 is a flowchart of a chat corpus collection method applied to a conversation system according to an embodiment of the present disclosure.

FIG. 12 is a flowchart of a chat corpus collection method according to an embodiment of the present disclosure. The flowchart of the chat corpus collection method is applied to the conversation system 130 in the implementation environment shown in FIG. 1. As shown in FIG. 12, the chat corpus collection method may be executed by the conversation system 130 and may include the following steps.

In step S610, the conversation system selects a target user selection from users who initiate a conversation request, and obtains a user identifier corresponding to the target user.

The conversation request is initiated by a user to a conversation terminal through a terminal of the user. For example, in an anonymous conversation system, a user may trigger and call an anonymous conversation plug-in to initiate the conversation request through triggering of a preset button in the anonymous conversation plug-in, where the conversation request carries a user identifier.

For the conversation system, the received conversation requests come from multiple users. In other words, multiple users initiate conversation requests to the conversation system.

At this point, the conversation system can select the target user from these users.

In step S630, the conversation initiation content generated by the intelligent service system for the target user is obtained.

After the selection of the target user is completed, the conversation system provides the user identifier corresponding to the target user to the intelligent service system so as to obtain the conversation initiation content of each target user from the intelligent service system.

In step S650, the conversation initiation content is pushed based on a friend relationship established between the intelligent service system and the target user.

The conversation system will push the conversation initiation content, that is, the conversation initiation content dynamically generated by the intelligent service system may be separately pushed to the corresponding target user.

The conversation initiation content pushed from the intelligent service system to the target user through the conversation system is implemented based on the friend relationship established between the intelligent service system and the target user. That is, in this process, the intelligent service system establishes the friend relationship with the target user.

In step S670, the conversation between the intelligent service system and the target user in the conversation system is initiated through the push of the conversation initiation content.

Accordingly, the conversation between the intelligent service system and the target user in the conversation terminal is implemented, and the conversation can even be conducted between the intelligent service system and a large number of target users, thereby achieving the chat corpus collection in a large scope of users. In other words, by using the conversation terminal, the chat corpus collection task is assigned to a large number of target users, so that these target users can participate in the chat corpus collection. In one aspect, the privacy problem does not need to be considered; in another aspect, because the chat corpus collection is implemented by connecting the intelligent service system to the dialog system, the cost is greatly reduced.

It should be noted here that for any conversation system, the intelligent service system can be connected according to actual operation requirements to implement chat corpus collection. Therefore, the solution provided by the present disclosure has very high versatility and can adapt to chat corpus collection in various scenarios, and then solve the existing problems in chat corpus collection.

Figure 13:
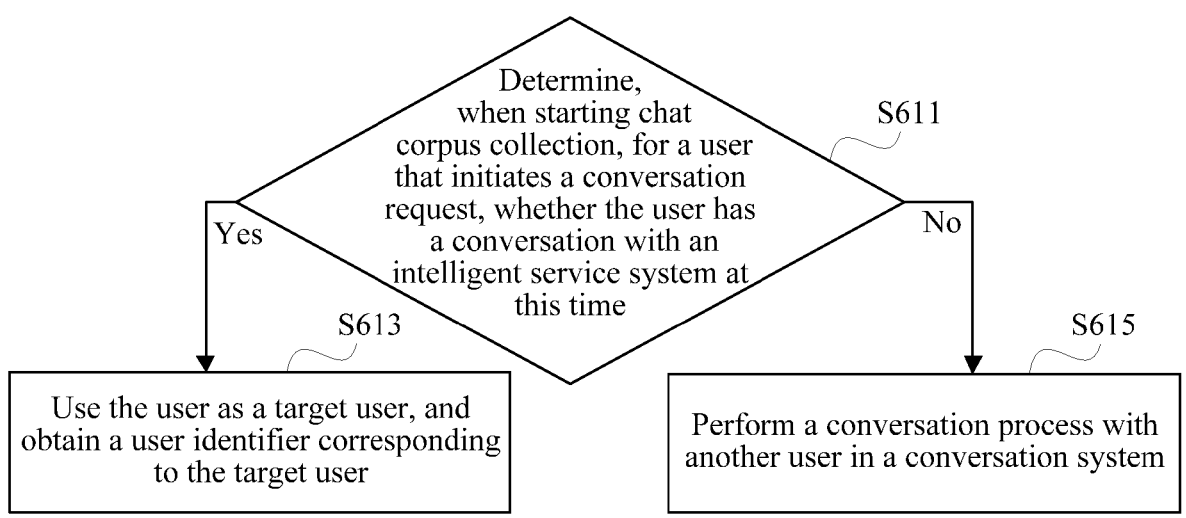
FIG. 13 is a flowchart of a step of selecting, by a conversation system, a target user based on a user that initiates a conversation request, and obtaining a user identifier corresponding to the target user of the embodiment corresponding to FIG. 12.

FIG. 13 depicts the details of step S610 shown in an embodiment of the present disclosure. As shown in FIG. 13, the chat corpus collection method may include the following steps.

In step S611, when starting chat corpus collection, it is determined, for a user that initiates a conversation request, whether the user has a conversation with the intelligent service system at this time. If yes, step S613 is performed, and if no, step S615 is performed.

A chat corpus collection switch is configured in the conversation system, which can be turned on or off according to the requirements of the project. When the chat corpus collection switch is turned on, the chat corpus collection can be started.

When the chat corpus collection starts, if the conversation request is received, it is determined whether to match the user that initiates the conversation request with the intelligent service system at this time, that is, whether to perform a conversation with the robot. If yes, the user is selected as the target user. If no, the conversation process between the user and another user is executed.

Specifically, the process of determining whether the user has a conversation with the robot at this time can be achieved through a preset rule. The preset rule includes but is not limited to the following.

(1) Avoiding repeated conversions between a user and the intelligent service system in a short period of time to prevent harassment to the user;

(2) Selecting the target user from the users according to the target corpus information and the user image information.

For example, within a period of time, a user will have only one conversation with the intelligent service system;

For another example, if chat corpus related to female users needs to be collected, a male user may not be selected as the target user, and only a female user may be selected as the target user.

In step S613, the user is selected as the target user and the user identifier corresponding to the target user is obtained.

In step S615, the conversation flow with other users in the conversation system is performed.

Through the process described above, the target user selection suitable for the chat corpus collection is achieved, thereby further facilitating the subsequent accurate collection of the chat corpus.

A chat corpus collection method according to an embodiment of the present disclosure may further include the following steps.

The conversation system updates the friend relationship corresponding to the intelligent service system and the friend relationship corresponding to the target user, and establishes a friend relationship between the intelligent service system and the target user through the update of the friend relationships.

The conversation system stores the friend relationship corresponding to the intelligent service system and the friend relationship corresponding to the target user. In an embodiment of the present disclosure, the friend relationship corresponding to the intelligent service system may be in the form of a list, that is, a friend list corresponding to the intelligent service system; correspondingly, the friend relationship corresponding to the target user may also be in the form of a list, that is, a friend list corresponding to the target user.

The update to the friend relationship of the intelligent service system is a process of adding the user identifier of the target user to the friend list of the intelligent service system, and the friend relationship of the target user is processed similarly.

In this way, a friend status between the intelligent service system and the target user is established in the conversation system, and on this basis, the conversation between the intelligent service system and the target user in the conversation system can be performed.

Figure 14:
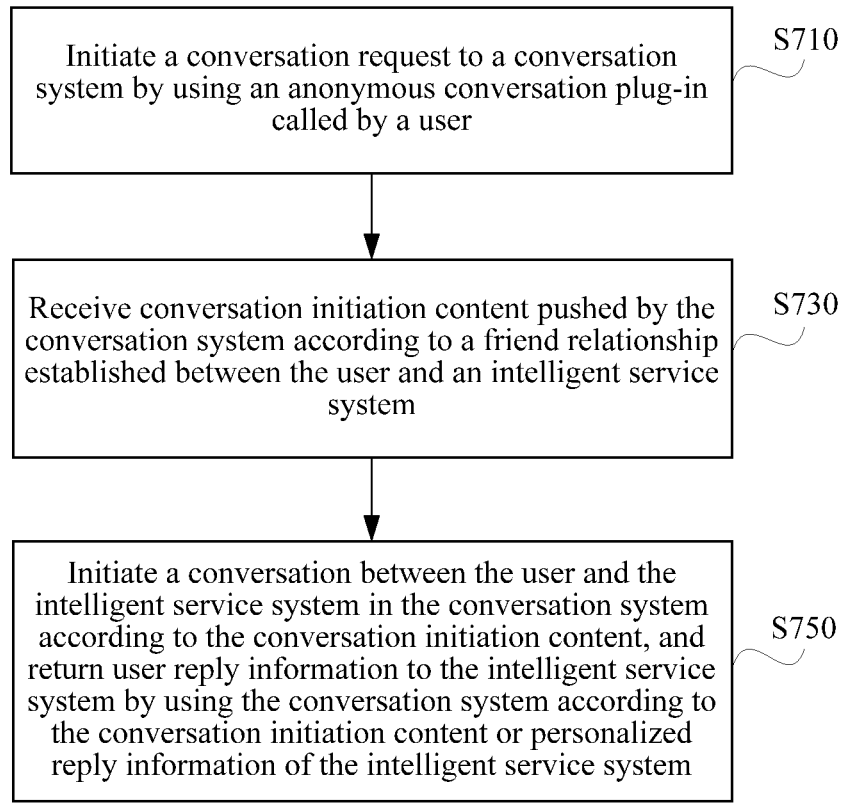
FIG. 14 is a flowchart of a chat corpus collection method applied to a user terminal according to an embodiment of the present disclosure.

FIG. 14 is a flowchart of a chat corpus collection method according to an embodiment of the present disclosure. The chat corpus collection method is applied to the user terminal 150 in the implementation environment shown in FIG. 1. As shown in FIG. 14, the chat corpus collection method can be executed by the user terminal 150, and may include the following steps.

In step S710, a conversation request is initiated to the conversation system by using an anonymous conversation plug-in called by a user.

In an embodiment of the present disclosure, the conversation system is an anonymous conversation system. The user terminal 150 is configured with the anonymous conversation plug-in. The anonymous conversation plug-in is used for enabling connection to the anonymous conversation system by using the user terminal, so that the user can initiate the conversation request and perform subsequent conversation in the anonymous conversation system.

Specifically, an anonymous conversation page can be entered by calling the anonymous conversation plug-in. On the anonymous conversation page, the conversation request can be initiated to the anonymous conversation system through the trigger of a certain button.

In step S730, conversation initiation content pushed by the conversation system according to the friend relationship established between the user and the intelligent service system is received.

When a user is selected as the target user for the chat corpus collection, the user can receive the conversation initiation content dynamically generated by the intelligent service system and returned by the conversation system.

In step S750, a conversation between the user and the intelligent service system is initiated in the conversation system by using the conversation initiation content, and user reply information is returned to the intelligent service system by the conversation system according to the conversation initiation content or personalized reply information of the intelligent service system In the anonymous conversation page that is jumped into by calling the anonymous conversation plug-in, the conversation initiation content or the personalized reply information returned by the intelligent service system according to the reply of the target user may be replied, to return the user reply information corresponding to the conversation initiation content or the personalized reply information.

Through the process describe above, the chat corpus collection based on the user terminal is achieved. This process is not different from the actual conversation process. That is, for the target user, it is a real chat scenario. Therefore, it is ensured that the chat corpus is real.

A chat corpus collection method according to an embodiment of the present disclosure may further include the following steps.

Conversation initiation content or personalized reply information is presented by using an anonymous conversation plug-in called by a user.

For the anonymous conversation plug-in called by the user terminal, when the conversation initiation content or the personalized reply information returned by the conversation system is received, the conversation initiation content or the personalized reply information is presented on the anonymous conversation page that the user terminal jumps into, to facilitate the searching and reply of the user.

Figure 15:
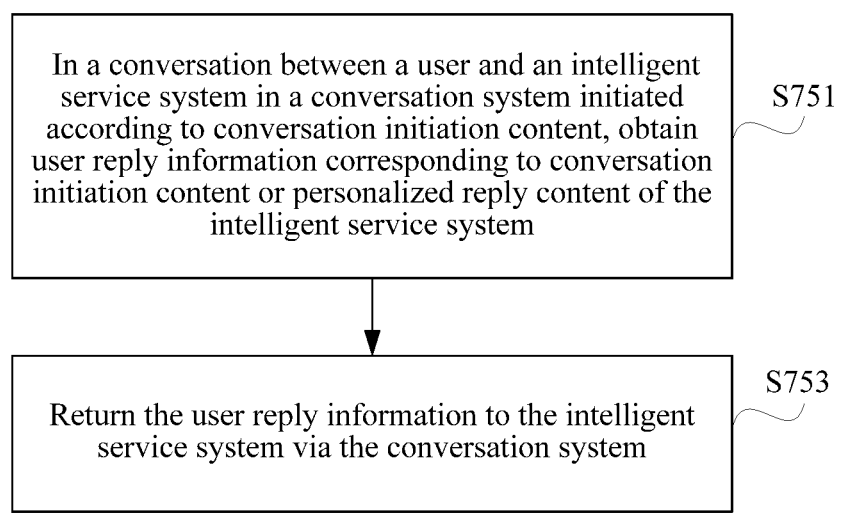
FIG. 15 is a flowchart of a step of initiating, by a user, a conversation between the user and an intelligent service system by using a conversation initiation content, and returning reply information of the user by using a dialog system according to the conversation initiation content or personalized reply information in the embodiment corresponding to FIG. 14.

FIG. 15 depicts the details of step S750 shown in an embodiment of the present disclosure. As shown in FIG. 15, step S750 may include the following steps.

In step S751, in the conversation initiated between the user and the intelligent service system in the conversation system according to the conversation initiation content, the anonymous conversation plug-in is called to acquire the user reply information corresponding to the conversation initiation content or the personalized reply information of the intelligent service system.

The inputted user reply information can be obtained from the anonymous conversation page of the anonymous conversation plug-in. The user reply information corresponds to the conversation initiation content or the personalized reply content of the intelligent service system, and may be text information, or voice information, or even picture information.

In step S753, the user reply information is returned to the intelligent service system via the conversation system.

For example, the user terminal is a smart phone and the conversation system is an anonymous conversation system. The chat corpus collection method is described in connection with a specific application scenario. Corresponding to the anonymous conversation system, the anonymous conversation plug-in configured in the smart phone is a drift bottle plug-in.

Figure 16:
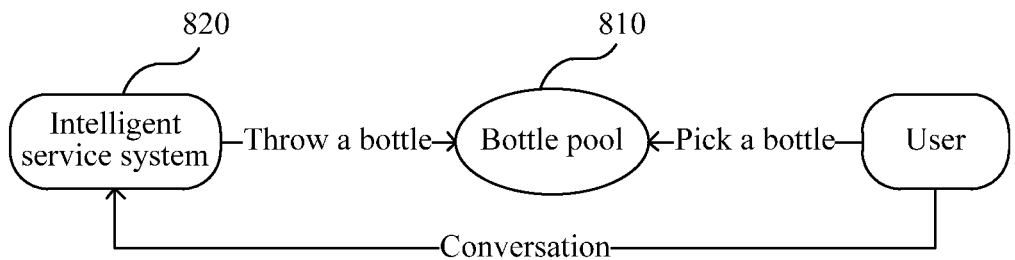
FIG. 16 is a schematic diagram of a chat corpus collection framework implemented by a user using a drift bottle plug-in according to an embodiment of the present disclosure.

FIG. 16 is a diagram of a chat corpus collection framework implemented by a user using a drift bottle plug-in according to an embodiment of the present disclosure.

In this framework, a bottle pool 810 is provided by using an anonymous conversation system. The bottle pool stores different conversation initiation content. The conversation initiation content may be from other users or from an intelligent service system 820.

The user initiates a conversation request through a bottle-picking process initiated by calling the drift bottle plug-in; the intelligent service system 820 also sends the conversation initiation content dynamically generated for the user to the bottle pool or resource pool 810 of the anonymous conversation system through a bottle-dropping process initiated by calling the drift bottle plug-in configured therein, and the conversation initiation content is further sent to the user from the bottle pool 810.

Thus, the conversation between the intelligent service system 820 and the user may be realized.

In a specific implementation, the conversation implemented by the intelligent service system and the user using the drift bottle plug-in in the anonymous conversation system must follow the original process of the anonymous conversation system.

Figure 17:
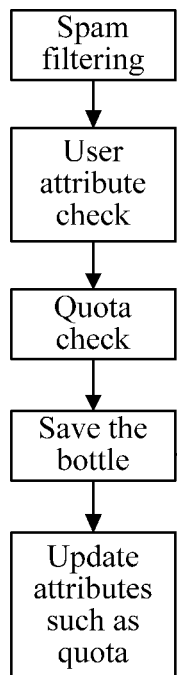
FIG. 17 is a flowchart of a conversation in an anonymous conversation system according to an embodiment of the present disclosure.
Figure 17:
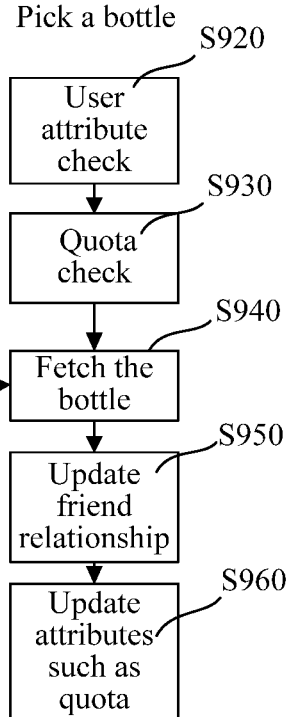

FIG. 17 illustrates the process of a conversation in an anonymous conversation system according to an embodiment of the present disclosure. It should be specially noted that in the anonymous conversation system, a certain quota is set for bottle dropping and bottle picking, to limit the number of times the user can drop the bottle and the number of times the user can pick the bottle. A drift bottle index 910 is a specific implementation of the bottle pool 810 shown in FIG. 16.

For the process that the user drops and picks the bottle shown in FIG. 17, since the chat corpus collection of the present disclosure only involves the process that the user picks the bottle, the process that the user picks the bottle is described herein.

Referring to the execution process of S920 to S930 shown in FIG. 17, when the user calls the drift bottle plug-in to jump into the anonymous conversation page, that is, the drift bottle page, the user can initiate the processes of dropping and picking the bottle on the drift bottle page.

In the process of jumping to the drift bottle page, user attributes are checked to obtain the attribute information about the city and gender of the user, and the number of times the user picks the bottle within a limited time range, so as to perform quota check and obtain the current corresponding quota for the user to pick the bottle. That is, the processes of S920 and S930 are implemented.

When the bottle picking quota is not used up, the user can initiate a bottle-picking process on the drift bottle page, that is, initiate a conversation request to the anonymous conversation system. At this time, the user is selected as a target user for the chat corpus collection by the anonymous conversation system, the friend relationship of the user in the anonymous conversation system is updated, and the conversation initiation content dynamically generated by the intelligent service system is obtained. Correspondingly, attributes such as the quota are also updated, that is, the process of S960 is executed.

Figure 18:
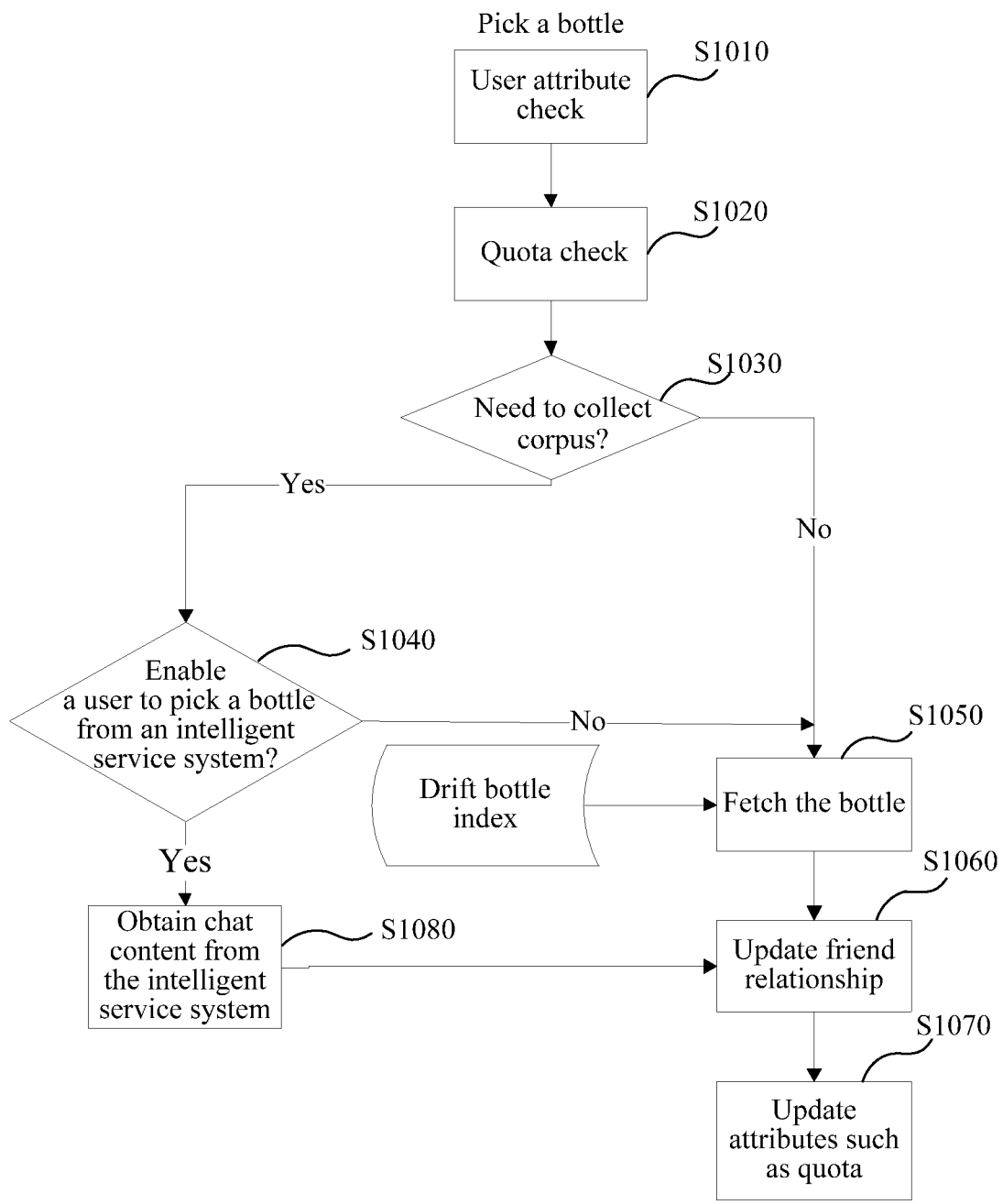
FIG. 18 is a flowchart of a working process of an anonymous conversation system according to an embodiment of the present disclosure.

FIG. 18 shows a working process of an anonymous conversation system according to an embodiment of the present disclosure. As shown in FIG. 18, when a user initiates the process of picking the bottle, the anonymous conversation system may obtain the user attribute and check the quota of the user quota, that is, S1010 and S1020 are performed.

When the user attribute is obtained and it is determined that the quota for picking the bottle of the user is not used up, it is determined whether chat corpus collection is required currently, that is, S1030 is performed.

When it is determined that the chat corpus collection is required, it is further determined whether the user is allowed to pick the bottle of the intelligent service system, that is, S1040 is performed.

If it is determined that the user cannot pick the bottle of the intelligent service system this time, a normal bottle-picking process is performed, that is, a bottle of another user is obtained from the drift bottle index, and the conversation initiation content in the bottle of the other user is obtained by updating the friend relationship. The quota and other attributes are updated accordingly, that is, the process from S1050 to S1070 is directly performed.

If it is determined that the user picks the bottle of the intelligent service system this time, the conversation initiation content is obtained from the intelligent service system, that is, S1080 is performed.

At this time, the conversation initiation content generated by the intelligent service system is also sent to the user by updating the friend relationship, and then the chat corpus collection can be achieved through the constant reply between the user and the intelligent service system.

Figure 19:
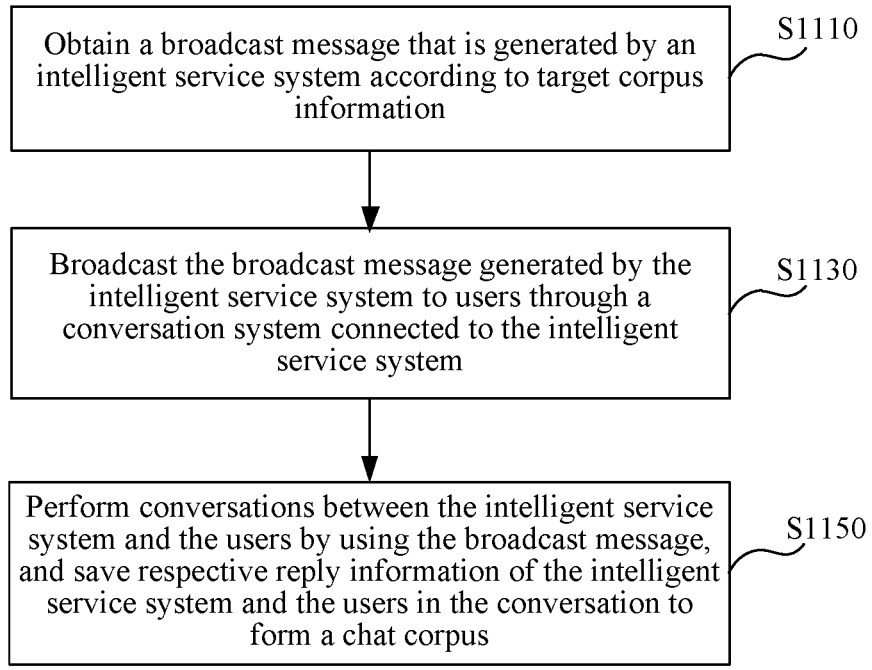
FIG. 19 is a flowchart of a chat corpus collection method according to another exemplary embodiment.

FIG. 19 is a flowchart of a chat corpus collection method according to an embodiment of the present disclosure. The chat corpus collection method is applied to the conversation system 130 in the implementation environment shown in FIG. 1. As shown in FIG. 19, the chat corpus collection method may include the following steps.

In step S1110, a broadcast message generated by the intelligent service system according to target corpus information is obtained.

The intelligent service system generates the target corpus information according to the chat corpus collection to be performed currently, and then generates a broadcast message that matches the target corpus information.

The broadcast message is broadcast to all or a large number of users by the intelligent service system in the conversation system connected to the intelligent service system, to initiate a wide chat corpus collection.

In step S1130, the broadcast message generated by the intelligent service system is broadcasted to the users through the conversation system connected to the intelligent service system.

In step S1150, the conversations between the intelligent service system and the users are performed by using the broadcast message, and respective reply information of the intelligent service system and the users in the conversation is saved to form a chat corpus.

The conversation between the intelligent service system and a user is initiated by using the broadcast message, and the conversation between the user and the intelligent service system continues as the user responds to the broadcast message.

With the progress of the conversation, in one aspect, the intelligent service system first receives the user reply information returned by the user in response to the broadcast message.

In this regard, the intelligent service system obtains the user image information of the user, and generates personalized reply information corresponding to the user reply information according to the user image information, so as to continue the conversation between the intelligent service system and the user.

In subsequent conversation, the intelligent service system continues to generate personalized reply information for the received user reply information.

In another aspect, the conversation system serves as a transfer channel between the intelligent service system and the user to implement the chat corpus collection for the intelligent service system connected to the conversation system.

Figure 20:
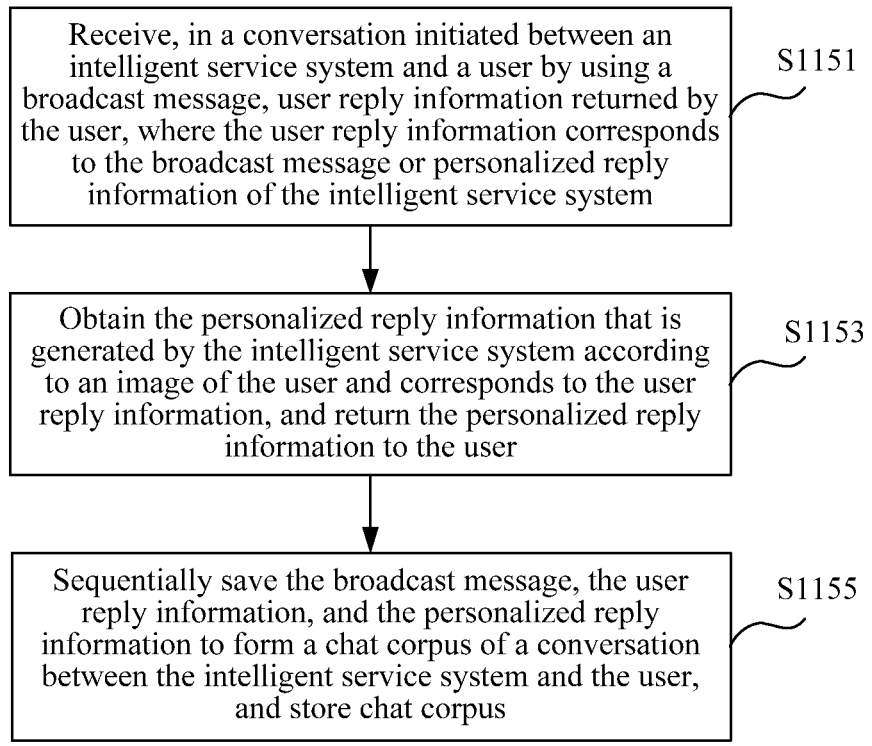
FIG. 20 is a flowchart illustrating a step of implementing a conversation between an intelligent service system and a user by using a broadcast message, and forming a chat corpus by saving respective reply information of the intelligent service system and the user in the conversation.

FIG. 20 depicts the details of step S1150 shown in an embodiment of the present disclosure. As shown in FIG. 20, step S1150 may include the following steps.

In step S1151, in the conversation initiated between the intelligent service system and the user by using the broadcast message, the user reply information returned by the user is received, where the user reply information corresponds to the broadcast message or personalized reply information of the intelligent service system.

The personalized reply information is generated by the intelligent service system in the conversation according to the user image information based on the user reply information returned by the user, and is used to reply the user.

As the conversation system sends out the broadcast message and the personalized reply of the intelligent service system in sequence, the conversation system may also receive the user reply information returned by the user in sequence.

In step S1153, the personalized reply information that is generated by the intelligent service system according to an image of the user and corresponds to the user reply information is obtained, and the personalized reply information is returned to the user.

In step S1155, the broadcast message, the user reply information, and the personalized reply information are sequentially saved to form a chat corpus of the conversation between the intelligent service system and the user, and the chat corpus is stored.

Through the process described above, targeted chat corpus collection can be achieved among a wide range of users, thereby maximizing the efficiency of the chat corpus collection.

The following is an apparatus embodiment of the present disclosure, which can be used to implement the embodiment of the chat corpus collection method performed by the intelligent service system 110 of the present disclosure. For details not disclosed in the apparatus embodiment of the present disclosure, refer to the embodiment of the chat corpus collection method of the present disclosure.

Figure 21:
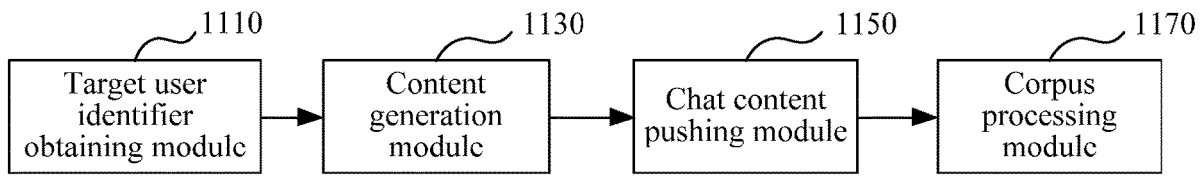
FIG. 21 is a block diagram of a chat corpus collection apparatus applied to a machine end according to an embodiment of the present disclosure.

FIG. 21 is a block diagram of a chat corpus collection apparatus according to an embodiment of the present disclosure. The chat corpus collection apparatus can be used in the intelligent service system 110 of the implementation environment shown in FIG. 1, for performing all the steps of the chat corpus collection method shown in FIG. 8. As shown in FIG. 21, the chat corpus collection apparatus includes, but is not limited to, a target user identifier obtaining module 1110, a content generation module 1130, a conversation initiation content pushing module 1150, and a corpus processing module 1170.

The target user identifier obtaining module 1110 is configured to obtain a user identifier corresponding to a target user.

The content generation module 1130 is configured to dynamically generate conversation initiation content according to user image information corresponding to the user identifier and target corpus information.

The conversation initiation content pushing module 1150 is configured to push the conversation initiation content to a conversation system connected to the intelligent service system.

The corpus processing module 1170 is configured to perform conversations related to the conversation initiation content between the intelligent service system and the target user through the conversation system, and save respective reply information of the intelligent service system and the target user in the conversation to form a chat corpus.

Optionally, the target identifier obtaining module 1110 is further configured to receive the user identifier returned by the conversation system to the intelligent service system by performing target user selection, where the user identifier corresponds to the target user.

Figure 22:
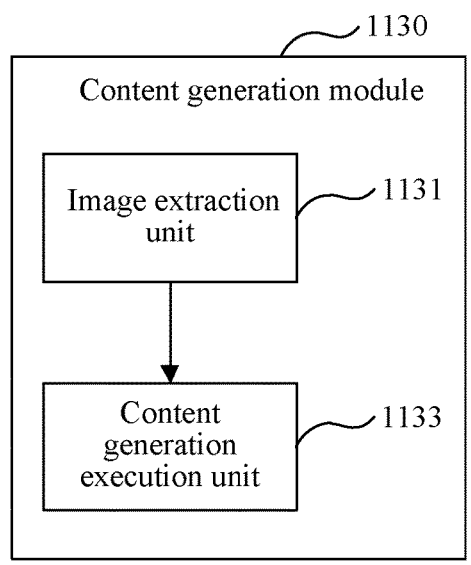
FIG. 22 is a block diagram of a content generation module of the embodiment corresponding to FIG. 21.

FIG. 22 depicts the details of the content generation module 1130 according to an embodiment of the present disclosure. As shown in FIG. 22, the content generation module 1130 includes but is not limited to an image extraction unit 1131 and a content generation execution unit 1133.

The image extraction unit 1131 is configured to extract the user image information according to the user identifier.

The content generation execution unit 1133 is configured to generate the conversation initiation content that is related to the target corpus information and matches the user image.

Figure 23:
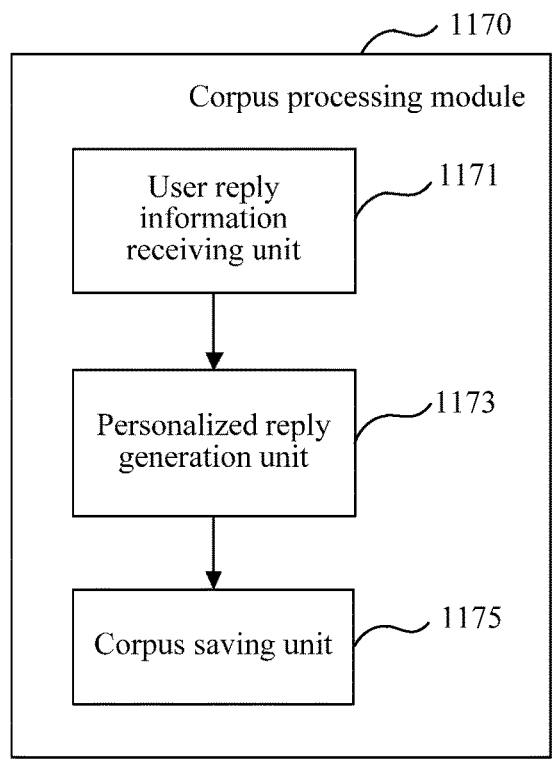
FIG. 23 is a block diagram of a corpus processing module of the embodiment corresponding to FIG. 21.

FIG. 23 depicts the details of a corpus processing module 1170 shown in an embodiment of the present disclosure. As shown in FIG. 23, the corpus processing module 1170 includes but is not limited to a user reply information receiving unit 1171, a personalized reply generation unit 1173, and a corpus saving unit 1175.

The user reply information receiving unit 1171 is configured to receive user information returned by the target user through the conversation system according to the conversation initiation content or the personalized reply information generated by the intelligent service system from the conversation between the intelligent service system and the target user initiated by using the conversation initiation content.

The personalized reply generation unit 1173 is configured to generate personalized reply information corresponding to the user reply information, and return the personalized reply information to the target user through the conversation system.

The corpus saving unit 1175 is configured to save the user reply information and the personalized reply information in sequence to form a chat corpus between the intelligent service system and the target user, and save the chat corpus.

Figure 24:
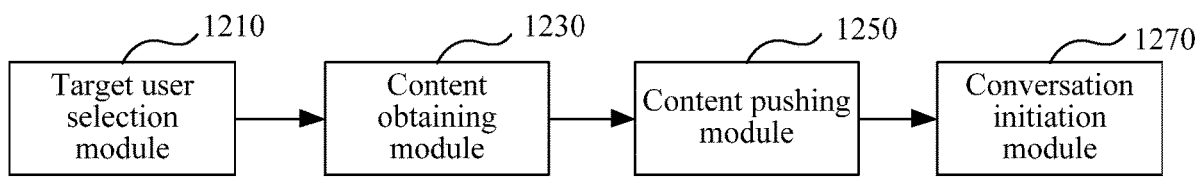
FIG. 24 is a block diagram of a chat corpus collection apparatus applied to a conversation system according to an embodiment of the present disclosure.

FIG. 24 is a block diagram of a chat corpus collection apparatus according to an embodiment of the present disclosure. The chat corpus collection apparatus includes but is not limited to a target user selection module 1210, a content obtaining module 1230, a content pushing module 1250, and a conversation initiation module 1270.

The target user selection module 1210 is configured to select a target user from users who initiate a conversation request, and obtain a user identifier corresponding to the target user.

The content obtaining module 1230 is configured to obtain conversation initiation content generated by an intelligent service system for the target user.

The content pushing module 1250 is configured to push the conversation initiation content according to a friend relationship established between the intelligent service system and the target user.

The conversation initiation module 1270 is configured to initiate a conversation between the intelligent service system and the target user in a conversation system according to the pushed conversation initiation content.

Figure 25:
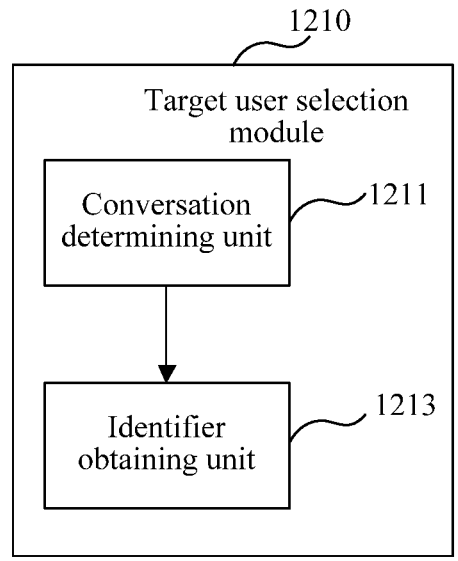
FIG. 25 is a block diagram of a target user selection module of the embodiment corresponding to FIG. 24.

Optionally, as shown in FIG. 25, the target user selection module 1210 includes a conversation determining unit 1211 and an identifier obtaining unit 1213.

The conversation determining unit 1211 is configured to determine, when chat corpus collection starts, whether a user who initiates the conversation request has the conversation with the intelligent service system at this time, if yes, notify the identifier obtaining unit 1213, and if not, perform a conversation process with another user in the conversation system.

The identifier obtaining unit 1213 is configured to use the user as the target user and obtain the user identifier corresponding to the target user.

A chat corpus collection apparatus according to another exemplary embodiment further includes a relationship update module.

The relationship update module is configured to update friend relationships corresponding to the intelligent service system and the target user, and establish a friend relationship between the intelligent service system and the target user through the update of the friend relationships.

Figure 26:
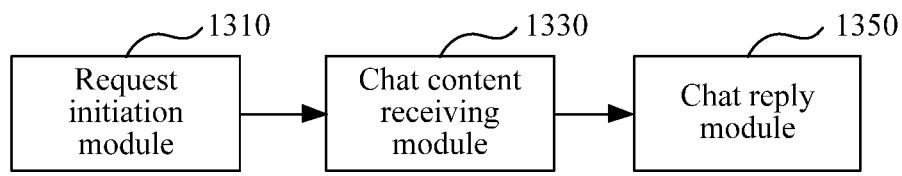
FIG. 26 is a block diagram of a chat corpus collection apparatus applied to a user terminal according to an embodiment of the present disclosure.

FIG. 26 is a chat corpus collection apparatus according to an embodiment of the present disclosure, which is applied to a conversation between a user and an intelligent service system. As shown in FIG. 26, the chat corpus collection apparatus includes but is not limited to: a request initiating module 1310, a conversation initiation content receiving module 1330 and chat reply module 1350.

The request initiation module 1310 is configured to initiate a conversation request to a conversation system by using a called anonymous conversation plug-in.

The conversation initiation content receiving module 1330 is configured to receive the conversation initiation content pushed by the conversation system according to a friend relationship established between the user and the intelligent service system.

The chat reply module 1350 is configured to return user reply information to the intelligent service system through the conversation system according to the conversation initiation content or personalized reply information of the intelligent service system, through a conversation initiated between the user and the intelligent service system in the conversation system by using the conversation initiation content.

Optionally, the chat corpus collection apparatus further includes a presentation module. The presentation module is configured to present the conversation initiation content or the personalized reply information by calling an anonymous conversation plug-in.

Figure 27:
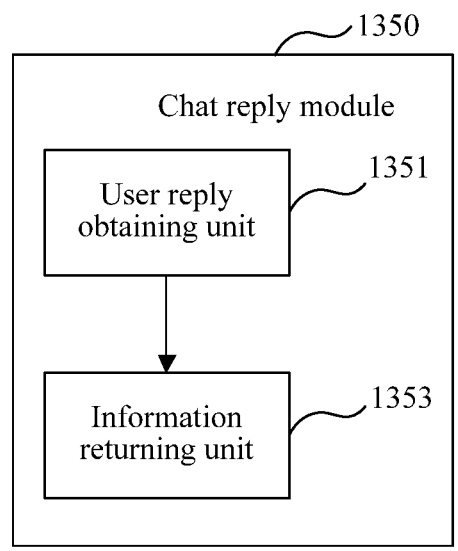
FIG. 27 is a block diagram of a chat reply module of the embodiment corresponding to FIG. 26.

FIG. 27 depicts the details of a chat reply module according to an embodiment of the present disclosure. The chat reply module 1350 includes, but is not limited to, a user reply obtaining unit 1351 and an information returning unit 1353.

The user reply obtaining unit 1351 is configured to obtain user reply information corresponding to the conversation initiation content or the personalized reply content of the intelligent service system by the called anonymous conversation plug-in in the conversation between the user and the intelligent service system in the conversation initiation system initiated by using the conversation initiation content.

The information returning unit 1353 is configured to return the user reply information to the intelligent service system through the conversation system.

Figure 28:
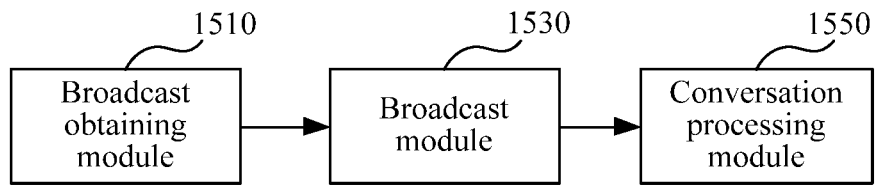
FIG. 28 is a block diagram of a chat corpus collection apparatus according to another exemplary embodiment.

FIG. 28 is a block diagram of a chat corpus collection apparatus according to an embodiment of the present disclosure. As shown in FIG. 28, the chat corpus collection apparatus includes but is not limited to a broadcast obtaining module 1510, a broadcast module 1530, and a conversation processing module 1550.

The broadcast obtaining module 1510 is configured to obtain a broadcast message generated by an intelligent service system according to target corpus information.

The broadcast module 1530 is configured to broadcast the broadcast message generated by the intelligent service system to users through a conversation system connected to the intelligent service system.

The conversation processing module 1550 is configured to perform conversations between the intelligent service system and the users by using the broadcast message, where respective reply information of the intelligent service system and the users is saved to form a chat corpus.

Figure 29:
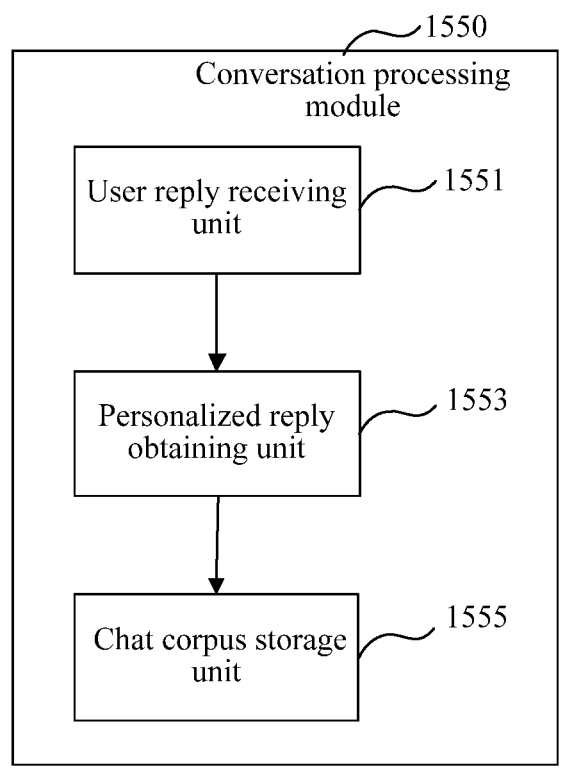
FIG. 29 is a block diagram of a conversation processing module in the embodiment corresponding to FIG. 28.

FIG. 29 depicts the details of the conversation processing module according to an embodiment of the present disclosure. As shown in FIG. 29, the conversation processing module 1550 includes, but is not limited to, a user reply receiving unit 1551, a personalized reply obtaining unit 1553, and a chat corpus storage unit 1555.

The user reply receiving unit 1551 is configured to receive user reply information returned by the user in the conversation initiated by using the broadcast message between the intelligent service system and the user, where the user reply information corresponds to the broadcast message or the personalized reply information of the intelligent service system.

The personalized reply obtaining unit 1553 is configured to obtain the personalized reply information generated by the intelligent service system according to the user image and corresponding to the user reply information, and return the personalized reply information to the user.

The chat corpus storage unit 1555 is configured to save the broadcast messages, the user reply information, and the personalized reply information saved in sequence to form a chat corpus of the conversation between the intelligent service system and the user, and store the chat corpus.

Optionally, the present disclosure also provides a chat corpus collection apparatus. The chat corpus collection apparatus can be applied to the intelligent service system 110 of the implementation environment shown in FIG. 1, to perform all or a part of the steps of the chat corpus collection method shown in FIG. 8, FIG. 9, FIG. 10, FIG. 12, FIG. 13, FIG. 14, FIG. 15, FIG. 19, and FIG. 20. The apparatus includes a processor and a memory for storing processor executable instructions. The processor is configured to execute: obtaining, for an intelligent service system, a user identifier corresponding to a target user; dynamically generating conversation initiation content according to user image information corresponding to the user identifier and target corpus information; pushing the conversation initiation content to a conversation system connected to the intelligent service system, and initiating a conversation between the intelligent service system and the target user by using the conversation initiation content; and performing the conversation between the intelligent service system and the target user through the conversation system, and saving respective reply information of the intelligent service system and the target user in the conversation to form a chat corpus.

The specific manner in which the processor of the apparatus in one embodiment operates has been described in detail in the embodiments of the chat corpus collection method, and may not be described in detail herein.

It should be noted that the foregoing method embodiments, for the sake of simple description, are all expressed as a series of action combinations, but persons skilled in the art should understand that the present disclosure is not limited by the described sequence of actions. Because according to the present disclosure, certain steps may be performed in other orders or simultaneously.

In the foregoing embodiments, the description of each embodiment has its own emphasis. For the part that is not described in detail in an embodiment, reference may be made to the relevant description of other embodiments.

Persons of ordinary skill in the art may understand that all or some of the various methods in the above embodiments may be implemented by hardware instructed by a program. The program may be stored in a computer-readable storage medium. The storage medium may include: flash disk, read-only memory (ROM), random access memory (RAM), magnetic disk, or optical disc.

The method, server, and system provided by the embodiments of the present disclosure have been described in detail above. Specific examples are used herein to explain the principle and implementation of the present disclosure. The above description of the embodiments is only used to help understand the method and core idea of the application; at the same time, persons of ordinary skill in the art, based on the idea of the present disclosure, may make changes to the specific implementation and application scope. In summary, the content of the specification should not be construed as a limitation to the present disclosure.

What is claimed is:

1. A method for processing random interaction data, comprising:
   receiving random interaction data sent by a first terminal, the random interaction data carrying user attribute information and inputted conversation information of a user of the first terminal;
   obtaining a total number of random interaction data items sent by the first terminal within a preset time period;
   in response to determining that the total number of the random interaction data items sent by the first terminal within the preset time period is less than a preset quota, increasing the total number of the random interaction data by one and adding the random interaction data to a resource pool;
   in response to a data obtaining request from one or more second terminals, retrieving the random interaction data from the resource pool and sending, via a first interface, the random interaction data to the one or more random second terminals to solicit a reply message, the random interaction data being presented as an anonymous message on each of the one or more second terminals;
   when a reply message for the random interaction data is received from one of the one or more second terminals, sending, via the first interface, the reply message to the first terminal to complete a one-on-one exchange between the first terminal and the one of the one or more second terminal;
   among a plurality of second terminals, counting a total number of the second terminals making no reply to the random interaction data after the plurality of second terminals receive the random interaction data, wherein a second terminal making no reply to the random interaction data indicates that a user of the second terminal has received and read the random interaction data but no reply message corresponding to the random interaction data is received from the second terminal within a preset time threshold; and
   when the total number of the second terminals exceeds a preset threshold,
      triggering a switch from the first interface to a second interface and sending the random interaction data to an intelligent dialog system via the second interface, wherein the intelligent dialog system is configured to automatically generate reply information according to at least the inputted conversation information and the user attribute information;
      receiving the reply information returned by the intelligent dialog system; and
         sending the reply information to the first terminal, the reply information being presented as an anonymous reply message for the random interaction data;
   in response to determining that the total number of the random interaction data items within the preset time period is not less than the preset quota, sending prompt information to the first terminal about waiting for a period of time for the user to send out the random interaction data, wherein the random interaction data is not added to the resource pool.

2. The method according to claim 1, wherein the adding the random interaction data to a resource pool comprises:

adding the random interaction data to the resource pool according to the user attribute information of the user of the first terminal.

3. The method according to claim 1, further comprising:
selecting a target user based on the user of the first terminal, and obtaining a user identifier corresponding to the target user;
obtaining conversation initiation content generated by the intelligent dialog system for the target user;
pushing the conversation initiation content by using a friend relationship established between the intelligent dialog system and the target user; and
initiating a conversation between the intelligent dialog system and the target user according to the pushed conversation initiation content.

4. The method according to claim 3, wherein the selecting a target user based on the user of the first terminal, and obtaining a user identifier corresponding to the target user comprises:
when starting chat corpus collection, determining for the user of the first terminal whether the user of the first terminal has a conversation with the intelligent dialog system at this time;
when it is determined that the user of the first terminal has a conversation with the intelligent dialog system at this time, using the user of the first terminal as the target user, and obtaining the user identifier corresponding to the user of the first terminal.

5. The method according to claim 3, wherein, before pushing the conversation initiation content by using a friend relationship established between the intelligent dialog system and the target user, the method further comprises:
separately updating a friend relationship corresponding to the intelligent dialog system and a friend relationship corresponding to the target user, and establishing the friend relationship between the intelligent dialog system and the target user by update of the friend relationship corresponding to the intelligent dialog system and the friend relationship corresponding to the target user.

6. The method according to claim 1, wherein the method further comprises:
obtaining a broadcast message generated by the intelligent dialog system according to target corpus information;
broadcasting the broadcast message generated by the intelligent dialog system to a target user; and
performing a conversation between the intelligent dialog system and the user by using the broadcast message, and saving reply information of the intelligent dialog system and the target user in the conversation to form a chat corpus.

7. The method according to claim 6, wherein the performing a conversation between the intelligent dialog system and the user by using the broadcast message, and saving reply information of the intelligent dialog system and the target user in the conversation to form a chat corpus comprises:
in the conversation initiated between the intelligent dialog system and the target user by using the broadcast message, receiving user reply information returned by the target user, wherein the user reply information corresponds to the broadcast message or personalized reply information of the intelligent dialog system;
obtaining personalized reply information generated by the intelligent dialog system according to an image of the target user and corresponds to the user reply information, and returning the personalized reply information to the target user; and
sequentially saving the broadcast message, the user reply information, and the personalized reply information to form a chat corpus of the conversation between the intelligent dialog system and the target user, and storing the chat corpus.

8. An apparatus for processing random interaction data, comprising:
a memory storing computer instructions; and
a processor executing the computer instructions to perform:
receiving random interaction data sent by a first terminal, the random interaction data carrying user attribute information and inputted conversation information of a user of the first terminal;
obtaining a total number of random interaction data items sent by the first terminal within a preset time period;
in response to determining that the total number of the random interaction data items sent by the first terminal within the preset time period is less than a preset quota, increasing the total number of the random interaction data by one and adding the random interaction data to a resource pool;
in response to a data obtaining request from one or more second terminals, retrieving the random interaction data from the resource pool and sending, via a first interface, the random interaction data to the one or more random second terminals to solicit a reply message, the random interaction data being presented as an anonymous message on each of the one or more second terminals;
when a reply message for the random interaction data is received from one of the one or more second terminals, sending, via the first interface, the reply message to the first terminal to complete a one-on-one exchange between the first terminal and the one of the one or more second terminal;
among a plurality of second terminals, counting a total number of the second terminals making no reply to the random interaction data after the plurality of second terminals receive the random interaction data, wherein a second terminal making no reply to the random interaction data indicates that a user of the second terminal has received and read the random interaction data but no reply message corresponding to the random interaction data is received from the second terminal within a preset time threshold; and
when the total number of the second terminals exceeds a preset threshold,
triggering a switch from the first interface to a second interface and sending the random interaction data to an intelligent dialog system via the second interface, wherein the intelligent dialog system is configured to automatically generate reply information according to at least the inputted conversation information and the user attribute information;
receiving the reply information returned by the intelligent dialog system; and
sending the reply information to the first terminal, the reply information being presented as an anonymous reply message for the random interaction data;
in response to determining that the total number of the random interaction data items within the preset time period is not less than the preset quota, sending prompt information to the first terminal about waiting for a period of time for the user to send out the random interaction data, wherein the random interaction data is not added to the resource pool.

9. The apparatus according to claim 8, wherein the adding the random interaction data to a resource pool comprises:
adding the random interaction data to the resource pool according to the user attribute information of the user of the first terminal.

10. The apparatus according to claim 8, wherein the processor further executes the computer instructions to perform:
selecting a target user based on the user of the first terminal, and obtaining a user identifier corresponding to the target user;
obtaining conversation initiation content generated by the intelligent dialog system for the target user;
pushing the conversation initiation content by using a friend relationship established between the intelligent dialog system and the target user; and
initiating a conversation between the intelligent dialog system and the target user according to the pushed conversation initiation content.

11. The apparatus according to claim 10, wherein the selecting a target user based on the user of the first terminal, and obtaining a user identifier corresponding to the target user comprises:
when starting chat corpus collection, determining for the user of the first terminal whether the user of the first terminal has a conversation with the intelligent dialog system at this time;
when it is determined that the user of the first terminal has a conversation with the intelligent dialog system at this time, using the user of the first terminal as the target user, and obtaining the user identifier corresponding to the user of the first terminal.

12. The apparatus according to claim 10, wherein, before pushing the conversation initiation content by using a friend relationship established between the intelligent dialog system and the target user, the processor further executes the computer instructions to perform:
separately updating a friend relationship corresponding to the intelligent dialog system and a friend relationship corresponding to the target user, and establishing the friend relationship between the intelligent dialog system and the target user by update of the friend relationship corresponding to the intelligent dialog system and the friend relationship corresponding to the target user.

13. The apparatus according to claim 8, wherein the processor further executes the computer instructions to perform:
obtaining a broadcast message generated by the intelligent dialog system according to target corpus information;
broadcasting the broadcast message generated by the intelligent dialog system to a target user; and
performing a conversation between the intelligent dialog system and the user by using the broadcast message, and saving reply information of the intelligent dialog system and the target user in the conversation to form a chat corpus.

14. The apparatus according to claim 13, wherein the performing a conversation between the intelligent dialog system and the user by using the broadcast message, and saving reply information of the intelligent dialog system and the target user in the conversation to form a chat corpus comprises:
in the conversation initiated between the intelligent dialog system and the target user by using the broadcast message, receiving user reply information returned by the target user, wherein the user reply information corresponds to the broadcast message or personalized reply information of the intelligent dialog system;
obtaining personalized reply information generated by the intelligent dialog system according to an image of the target user and corresponds to the user reply information, and returning the personalized reply information to the target user; and
sequentially saving the broadcast message, the user reply information, and the personalized reply information to form a chat corpus of the conversation between the intelligent dialog system and the target user, and storing the chat corpus.

15. A non-transitory computer storage medium storing computer instructions, the computer instructions, when being executed by a processor, cause the processor to perform:
receiving random interaction data sent by a first terminal, the random interaction data carrying user attribute information and inputted conversation information of a user of the first terminal;
obtaining a total number of random interaction data items sent by the first terminal within a preset time period;
in response to determining that the total number of the random interaction data items sent by the first terminal within the preset time period is less than a preset quota, increasing the total number of the random interaction data by one and adding the random interaction data to a resource pool;
in response to a data obtaining request from one or more second terminals, retrieving the random interaction data from the resource pool and sending, via a first interface, the random interaction data to the one or more random second terminals to solicit a reply message, the random interaction data being presented as an anonymous message on each of the one or more second terminals;
when a reply message for the random interaction data is received from one of the one or more second terminals, sending, via the first interface, the reply message to the first terminal to complete a one-on-one exchange between the first terminal and the one of the one or more second terminal;
among a plurality of second terminals, counting a total number of the second terminals making no reply to the random interaction data after the plurality of second terminals receive the random interaction data, wherein a second terminal making no reply to the random interaction data indicates that a user of the second terminal has received and read the random interaction data but no reply message corresponding to the random interaction data is received from the second terminal within a preset time threshold; and
when the total number of the second terminals exceeds a preset threshold,
triggering a switch from the first interface to a second interface and sending the random interaction data to an intelligent dialog system via the second interface, wherein the intelligent dialog system is configured to automatically generate reply information according to at least the inputted conversation information and the user attribute information;
receiving the reply information returned by the intelligent dialog system; and
sending the reply information to the first terminal, the reply information being presented as an anonymous reply message for the random interaction data;

in response to determining that the total number of the random interaction data items within the preset time period is not less than the preset quota, sending prompt information to the first terminal about waiting for a period of time for the user to send out the random interaction data, wherein the random interaction data is not added to the resource pool.

* * * * *